United States Patent
Sagou et al.

(10) Patent No.: US 10,717,342 B2
(45) Date of Patent: Jul. 21, 2020

(54) HEATING APPARATUS

(71) Applicant: DENSO CORPORATION, Kariya, Aichi-pref. (JP)

(72) Inventors: Yasuhiro Sagou, Kariya (JP); Kimitake Ishikawa, Kariya (JP); Hiroyasu Oide, Kariya (JP); Hideki Seki, Kariya (JP); Hideaki Kako, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 393 days.

(21) Appl. No.: 15/543,293

(22) PCT Filed: Feb. 2, 2016

(86) PCT No.: PCT/JP2016/000522
§ 371 (c)(1),
(2) Date: Jul. 13, 2017

(87) PCT Pub. No.: WO2016/129240
PCT Pub. Date: Aug. 18, 2016

(65) Prior Publication Data
US 2017/0349029 A1    Dec. 7, 2017

(30) Foreign Application Priority Data
Feb. 10, 2015 (JP) .................. 2015-024543

(51) Int. Cl.
*B60H 1/22* (2006.01)
*B60R 21/2165* (2011.01)
(Continued)

(52) U.S. Cl.
CPC ............. *B60H 1/22* (2013.01); *B60H 1/2215* (2013.01); *B60H 1/2226* (2019.05);
(Continued)

(58) Field of Classification Search
CPC .. B60H 1/2215; B60H 1/2218; B60H 1/2226; B60H 1/00271; B60H 1/00371;
(Continued)

(56) References Cited

U.S. PATENT DOCUMENTS

2005/0121890 A1   6/2005  Kong
2009/0289442 A1*  11/2009  Kim .................... B60R 21/2165
                                                        280/728.3

FOREIGN PATENT DOCUMENTS

| CN | 1616276 A | 5/2005 |
|---|---|---|
| JP | 2010023567 A | 2/2010 |
| WO | WO-2015/004852 A1 | 1/2015 |

* cited by examiner

*Primary Examiner* — Shawntina T Fuqua
(74) *Attorney, Agent, or Firm* — Harness, Dickey & Pierce, P.L.C.

(57) ABSTRACT

A heating apparatus has a heater body and a heater case. The heater body has a heat generator and emits heat supplied from the heat generator. The heat generator generates the heat when being energized. The heater case houses the heater body and is arranged on a side of an air-bag device for a vehicle adjacent to a vehicle compartment. The heater case is attached to an interior member located in the vehicle compartment or is a part of the interior member. The heater case has an expansion permissive portion that permits the air-bag device to expand into the vehicle compartment. The heat generator includes a portion located at a position corresponding to the expansion permissive portion. The heater body has a low strength portion that has a low strength as compared to the portion of the heat generator and that is located outside the expansion permissive portion.

15 Claims, 11 Drawing Sheets

(51) Int. Cl.
*B60R 21/206* (2011.01)
*B60R 21/215* (2011.01)

(52) U.S. Cl.
CPC .......... *B60R 21/206* (2013.01); *B60R 21/215* (2013.01); *B60R 21/2165* (2013.01); *B60H 2001/2228* (2013.01); *B60H 2001/2293* (2013.01)

(58) Field of Classification Search
CPC .............. B60H 1/2225; B60H 1/00285; B60H 2001/2778; B60H 2001/2293; B60H 2001/00221; B60H 2001/2246; B61D 17/10; B61D 27/0036; F24D 13/022; F24H 3/0429; H05B 3/342; H05B 3/36; H05B 3/16; H05B 3/18; H05B 3/0042; H05B 3/0019; H05B 3/00; H05B 2203/005; H05B 2203/017; H05B 2203/006; H05B 2203/007; H05B 2203/013; H05B 2203/015; H05B 2203/029; H05B 1/0236; H05B 1/0238

See application file for complete search history.

INTERIOR ← | → BACK SIDE OF INTERIOR MEMBER

EXPANSION DIRECTION OF AIR-BAG DEVICE

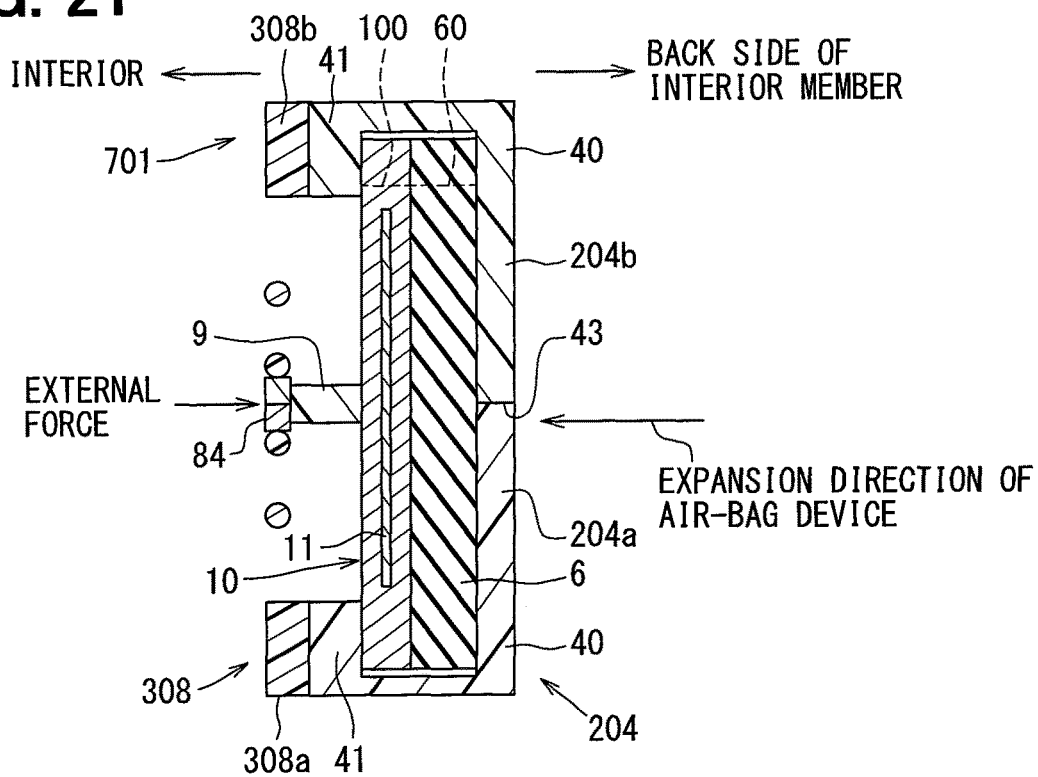
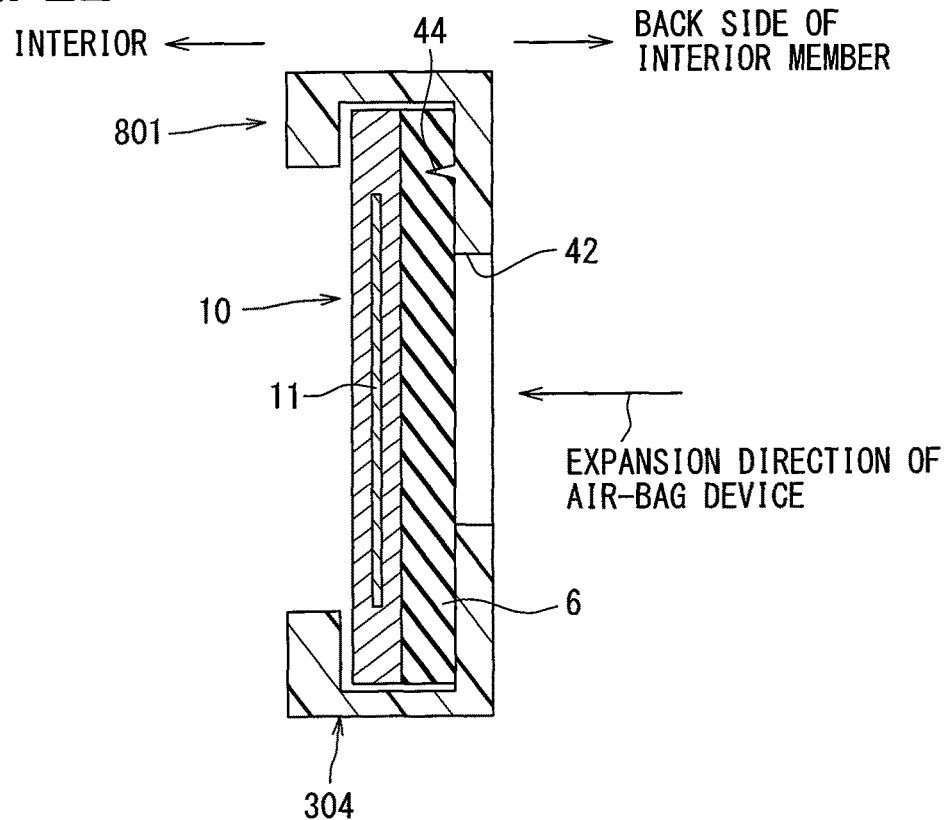

HEATING APPARATUS

CROSS REFERENCE TO RELATED APPLICATIONS

This application is a U.S. National Phase Application under 35 U.S.C. 371 of International Application No. PCT/JP2016/000522 filed on Feb. 2, 2016 and published in Japanese as WO 2016/129240 A1 on Aug. 18, 2016. This application is based on and claims the benefit of priority from Japanese Patent Application No. 2015-024543 filed on Feb. 10, 2015. The entire disclosures of all of the above applications are incorporated herein by reference.

TECHNICAL FIELD

The present disclosure relates to a heating apparatus that causes a feeling of warmth to a passenger in a vehicle compartment.

BACKGROUND ART

Patent Literature 1 discloses an example of a heating apparatus that is configured as a sheet heat generator. The heating apparatus described in Patent Literature 1 has the sheet heat generator that is arranged at a position corresponding to an expansion direction of an air-bag device. In addition, an interior member has a thin portion provided with a tear portion. The tear portion is broken preferentially when the air-bag device expands. The thin portion is provided in an opening portion of the sheet heat generator, in other words, at a position corresponding to a portion having no heat generator. Therefore, the air-bag device can expand from the opening portion of the sheet heat generator when a vehicle collides, and when the air-bag device is operated and expands. The opening portion of the sheet heat generator decreases a mechanical strength of a portion corresponding to the thin portion to be weaker than a mechanical strength of a portion not corresponding to the thin portion. Thus, the heating apparatus is configured not to prevent the air-bag device from expanding.

PRIOR ART LITERATURES

Patent Literature 1: JP 2010-23567 A

SUMMARY OF INVENTION

However, according to studies conducted by the inventors of the present disclosure, the heating apparatus of Patent Literature 1 cannot emit radiation heat from the opening portion when the opening portion is provided in the sheet heat generator arranged close to the passenger. As a result, an amount of the radiation heat supplied to the passenger decreases. That is, since the amount of the radiation heat decreases, a feeling of warmth of the passenger may deteriorate, and thereby the passenger may hardly feel warmth, as compared to a condition that the opening portion is not provided.

The present disclosure addresses the above-described issues, and thereby it is an objective of the present disclosure to provide a heating apparatus that has a structure that enables an air-bag device to expand, and to provide a heating apparatus that can secure a feeling of warmth to a passenger.

A heating apparatus has a heater body and a heater case. The heater body has a sheet shape. The heater body has a heat generator and emits heat supplied from the heat generator. The heat generator generates the heat when being energized. The heater case houses the heater body and is arranged on a side of an air-bag device for a vehicle adjacent to a vehicle compartment. The heater case is attached to an interior member located in the vehicle compartment or is a part of the interior member. The heater case has an expansion permissive portion that permits the air-bag device to expand into the vehicle compartment. The heat generator includes a portion located at a position corresponding to the expansion permissive portion. The heater body has a low strength portion that has a low strength as compared to the portion of the heat generator and that is located outside the expansion permissive portion.

According to the present disclosure, the heat generator is arranged in the portion corresponding to the expansion permissive portion that permits the air-bag device to expand, and thereby the portion can supply the radiant heat to the vehicle compartment. As a result, the heating apparatus can be configured to avoid reducing an amount of the radiant heat as compared to the above-described conventional technique and can be configured not to interrupt an expansion of the air-bag device.

In addition, the heater body has the low strength portion that has low strength and that is located outside the expansion permissive portion. Accordingly, the low strength portion can be provided in a portion of the heater body that is less necessary for radiating the radiant heat to the vehicle compartment. The portion of the heater body is, for example, a portion of the heater body located away from a center portion of the heater body and located adjacent to the outer edge. Since the heater body is broken in the portion of the heater body when the air-bag device expands, the heater body can be configured not to interrupt an expansion of the air-bag device.

Thus, according to the present disclosure, it can be provide the heating apparatus that has a configuration permitting the air-bag device to expand and that can secure a feeling of warmth of the passenger.

BRIEF DESCRIPTION OF DRAWINGS

The above and other objects, features and advantages of the present disclosure will become more apparent from the following detailed description made with reference to the accompanying drawings.

FIG. 21 is a cross sectional view illustrating a heater body of a radiant heater, a heater case, and a protection member, according to an eighth embodiment.

FIG. 22 is a cross sectional view illustrating a heater body of a radiant heater, a heater case, and a protection member, according to a ninth embodiment.

DESCRIPTION OF EMBODIMENTS

Figure 1:
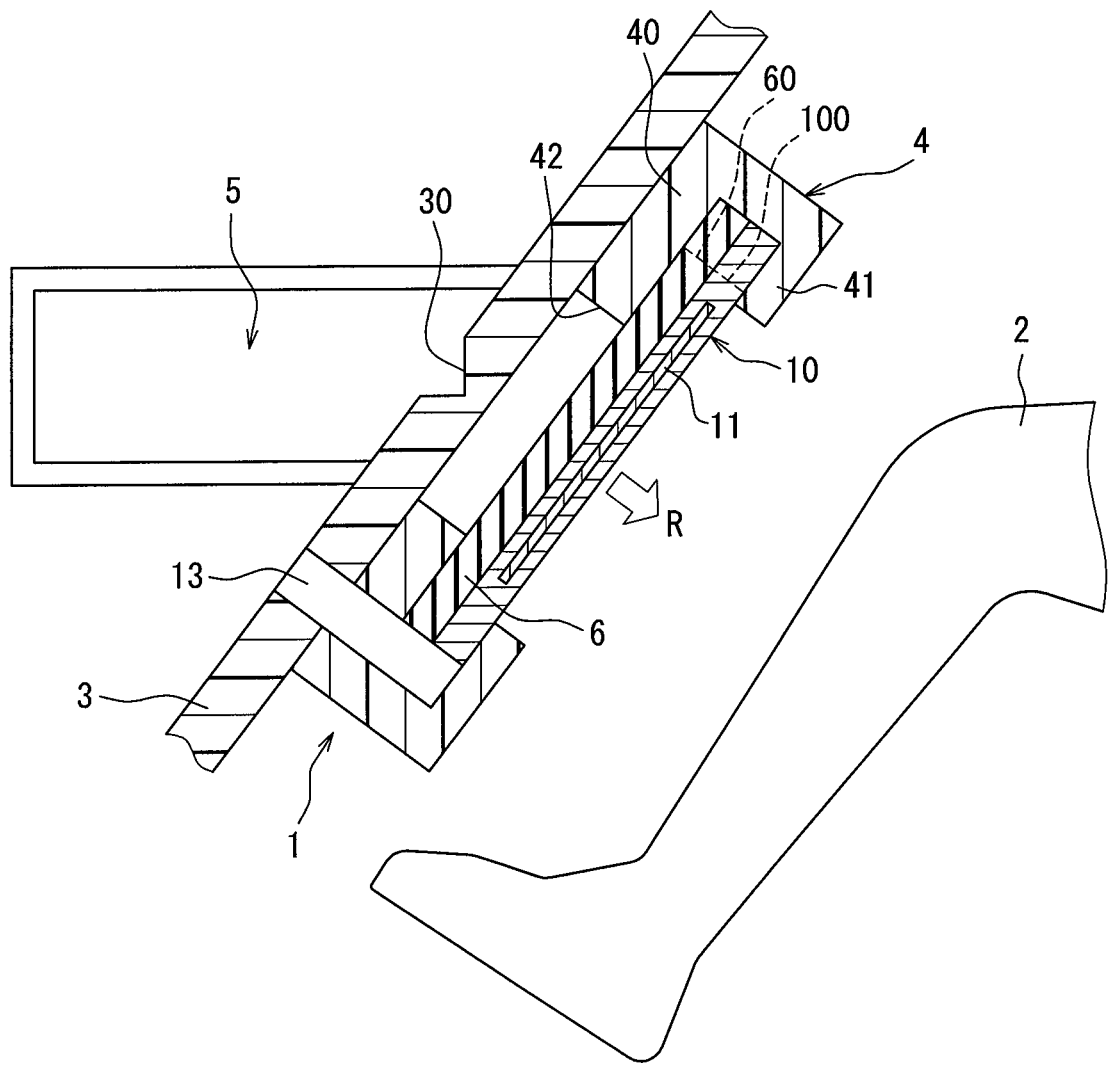
FIG. 1 is a diagram illustrating a locational relationship among a radiant heater, an air-bag device, and a passenger, according to the present disclosure.

Embodiments of the present disclosure will be described hereinafter referring to drawings.

In the embodiments, a part that corresponds to or equivalents to a part described in a preceding embodiment may be assigned with the same reference number, and a redundant description of the part may be omitted. In the embodiments, a configuration assigned with the same reference number as illustrated in the drawings regarding a preceding embodiment and a configuration of which description is omitted are the same as that of the preceding embodiment and provides the same operations and effects as the preceding embodiment.

When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A heating apparatus according to the present disclosure is attached to an interior member disposed in a vehicle compartment, has a heat generator, and supplies heat, which is emitted from the heat generator, into the vehicle compartment using radiant heat or a convection flow. Accordingly, the heating apparatus may be a radiant heater that is capable of supplying radiant heat transmitting through a hot wire from a solid surface having a high temperature to a solid surface having a low temperature regardless of a presence of air or the like between the solid surfaces.

A first embodiment is an example that provides a radiant heater 1 as a heater that is the heating apparatus disposed in the vehicle compartment. The radiant heater 1 will be referred to as the heater 1 simply hereafter. The heater 1 is disposed in a vehicle compartment of various vehicles moving on a road. The heater 1 of the first embodiment will be described hereafter referring to FIG. 1 to FIG. 5.

The heater 1 may be an electric heater that generates heat when being fed from a power source such as a battery or a power generator disposed in the vehicle. The heater 1 has a plate shape. The heater 1 generates heat when being energized. The heater 1 radiates a radiant heat R mainly in a direction perpendicular to a surface of the heater 1 so as to heat a target located to face the surface in the direction.

A seat is disposed in the vehicle compartment, and a passenger 2 has the seat. The heater 1 is disposed in the vehicle compartment to radiate the radiant heat R toward foot of the passenger 2. The heater 1 is disposed in an interior member such as an instrument panel, a door trim, or a ceiling portion disposed in the vehicle compartment.

As shown in FIG. 1, an air-bag device 5 is located adjacent to an interior member 3 on a back side of the interior member 3, in other words, on a side of the interior member 3 opposite to the vehicle compartment. Specifically, the air-bag device 5 is located in a portion of the interior member 3 that faces knees and lower legs of the passenger 2. That is, the heater 1 is located to face the passenger 2, on a condition of seating in possible normal postures, on a side of the air-bag device 5 adjacent to the vehicle compartment.

Figure 2:
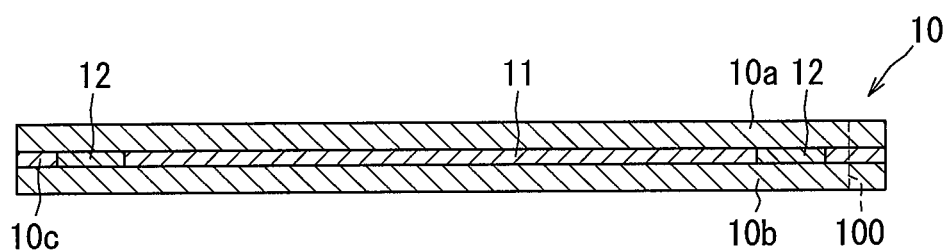
FIG. 2 is a cross-sectional view illustrating a heater body of a radiant heater according to a first embodiment.

FIG. 2 is a cross-sectional view illustrating an example of a configuration of a representative heater body of the heater 1. The heater 1 has a thin square plate shape. The heater 1 has a heater body 10 configuring a heater portion. The heater body 10 has heat generators 11 that generate heat when being energized and a pair of terminals 12 that is a conductive part. The heater 1 may be referred to as a sheet heater that radiates the radiant heat R from the surface of the heater 1 in the direction perpendicular to the surface.

The heater body 10 is made of a resin material that has great electrical insulation property and high-temperature endurance. The heater body 10 may be a multi-layer board. The heater body 10 is configured to have a top layer 10a, a back layer 10b, and an intermediate layer 10c. The top layer 10a faces in a radiation direction in which the heater body 10 radiates the radiant heat R. The top layer 10a is a surface that is arranged to face a part of a body of the passenger 2, which is a target to be heated, on a condition that the heater 1 is mounted in the vehicle. The back layer 10b configures a back surface of the heater 1. The intermediate layer 10c supports the heat generator 11 and the terminals 12 on a condition of being located between the top layer 10a and the back layer 10b. The heater body 10 is a member that supports the heat generators 11 that have an elongated shape. The top layer 10a, the back layer 10b, and the intermediate layer 10c are an insulation portion that is made of a material having thermal conductivity lower than that of the heat generator 11 and the terminals 12. For example, the top layer 10a, the back layer 10b, and the intermediate layer 10c are made of a resin material such as a polyimide resin that includes a material increasing thermal conductivity.

Each of the heat generators 11 is made of a material that generates heat when being energized. Each heat generator 11 may be made of a metallic material such as copper, silver, tin, stainless, nickel, or Nichrome (Trademark). The heat generators 11 have an elongated shape or a plate shape parallel to the surface of the heater body 10 and are arranged in the surface of the heater body 10 to be distanced from each other. The heat generators 11 as a whole may be a single elongated member that is distributed in an entirety of the heater body 10.

Each of the heat generators 11 is connected to the pair of terminals 12 arranged to be a specified interval distanced from each other. The heat generators 11 are located between the pair of terminals 12 and are arranged to be distanced from each other. The heat generators 11 are in parallel to each other and are connected to the pair of terminals 12 to bridge between the terminals 12. The heat generators 11 are arranged in almost an entirety of the surface of the heater body 10. The heat generators 11 and the intermediate layer 10c are located between the top layer 10a and the back layer 10b. The heat generators 11 are protected by the heater body 10 on an outer side of the heat generators 11. The top layer 10a and the back layer 10b can be provided by printing or adhesion.

The heat generators 11 are thermally connected at least to the top layer 10a and generate heat when being energized. The heat generated by the heat generators 11 is transmitted to the top layer 10a. Specifically, the heat generated by the heat generators 11 is transmitted to the top layer 10a through elements included in the heater body 10, and the layer 10a radiates the heat as the radiant heat toward the passenger 2 facing the top layer 10a.

A length of the heat generators 11 is set to generate a specified amount of heat. Accordingly, the heat generators 11 are designed to have a specified resistance value. A dimension and a shape of the heat generators 11 are set to have a specified thermal resistance in a lateral direction. Therefore, the heat generators 11 generate the specified amount of heat when a specified voltage is applied to the heat generators 11. The heat generators 11 generate the specified amount of heat, and thereby a temperature of the heat generators 11 increases to a specified temperature. The heat generators 11 having the specified temperature heat the top layer 10a to have a specified radiant temperature. Thus, the heater 1 can radiate the radiant heat R that provides a feeling of warmth to the passenger 2, i.e., a human.

A connector 13 supplying an electrical power is connected to the heater body 10. The connector 13 has a connector terminal that is coupled with a lead wire configured by bundling a current carrying wire supplying a current to the heat generators 11 and a signal wire such as a temperature signal wire.

An output, a temperature, and the amount of heat of the heat generators 11 are controlled by a heater ECU. The heater ECU is an electronic control unit that controls a voltage value and a current value applied to the heat generators 11, and thereby being capable of controlling the output, the temperature, and the amount of heat of the heat generators 11. For example, the heater ECU supplies electrical power from the battery to the heater 1, and can control the electrical power. The heater ECU controls the output from the heat generators 11 by controlling the electrical power.

That is, the heater ECU changes an amount of the radiant heat supplied to the passenger 2. A temperature of the surface of the heater 1 rapidly increases to a specified radiation temperature set by the heater ECU when the heater ECU starts applying electric power to the heater 1. As a result, the heater 1 can promptly provide the feeling or warmth to the passenger 2 even in winter.

When an object is in contact with the top layer 10a of the heater 1, heat being transmitted from the heat generators 11 to the top layer 10a is rapidly transmitted to the object being in contact with the top layer 10a. As a result, a temperature of a portion of the top layer 10a being in contact with the object falls rapidly. Accordingly, a surface temperature of a portion of the heater 1 being in contact with the object falls rapidly. Heat in the portion of the top layer 10a being in contact with the object is transmitted to the object and diffused. Therefore, a surface temperature of the object being in contact with the top layer 10a can be prevented from increasing rapidly.

A configuration of the heater 1 will be described hereafter with configurations regarding elements other than the heater body 10, referring to FIG. 1 and FIG. 3 to FIG. 5. The heater 1 has at least the heater body 10 having a sheet shape and a heater case 4 housing the heater body 10. The heater case 4 is located on the side of the air-bag device 5 for the vehicle adjacent to the vehicle compartment. The heater case 4 is disposed to the interior member 3 disposed in the vehicle compartment. The heater case 4 may be configured as a part of the interior member 3 and house the heater body 10. In this case, the part of the interior member 3 functions as the heater case 4.

For example, the air-bag device 5 is located adjacent to the interior member 3 on the back side of the interior member 3, in other words, on the side of the interior member 3 opposite to the vehicle compartment. The air-bag device 5 is disposed in a portion of the interior member 3 that faces knees and lower legs of the passenger 2. The portion of the interior member 3 adjacent to the air-bag device 5 is provided with a thin portion 30. A thickness dimension and strength of the portion of the interior member 3 are smaller than those of other portions of the interior member 3. The interior member 3 has a recessed portion, e.g., having a wedge shape, by providing the thin portion 30. The recessed portion may be referred to as a tear portion. When the vehicle collides with an object, the air-bag device 5 expands into the vehicle compartment. The thin portion 30 is preferentially broken when expansion force is applied from the air-bag device 5 to the interior member 3, and thereby permitting the air-bag device 5 to expand into the vehicle compartment.

Figure 3:
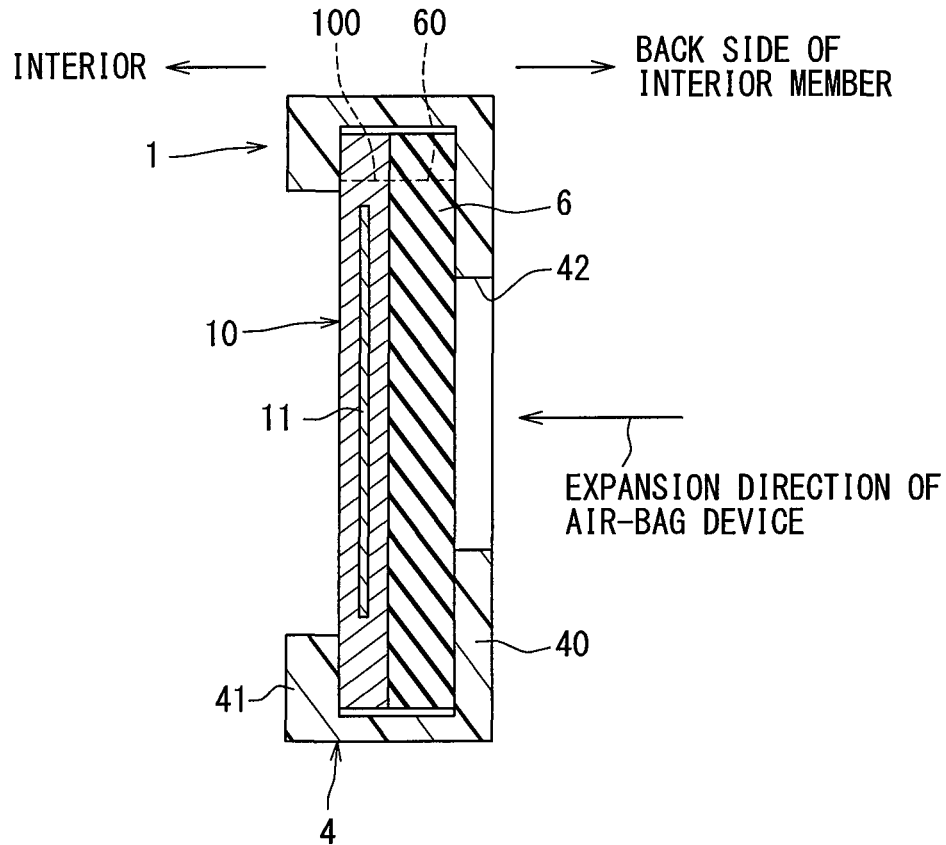
FIG. 3 is a cross-sectional view illustrating a locational relationship between a low strength portion of the radiant heater and an expansion permissive portion of a heater case, according to the first embodiment.

In addition, the heater case 4 is provided with an expansion permissive portion that permits the air-bag device 5 to expand into the vehicle compartment. The expansion permissive portion has an opening portion 42 passing through the heater case 4, for example, as shown in FIG. 1 and FIG. 3. When the vehicle collides with the object, the air-bag device 5 starts to expand, breaks through the interior member 3 by tearing the thin portion 30, and expands into the vehicle compartment from the opening portion 42.

The heater 1 has a thermal insulation member 6 that is located on a side of the heater body 10 opposite to the vehicle compartment and that covers the heater body 10. The thermal insulation member 6 configures a thermal insulation member that prevents heat from being radiated from the heater body 10 to the back side of the heater body 10. The thermal insulation member 6 is made of a material such as a foamable material, urethane resin, or a rubber material having thermal insulation properties. The material making the thermal insulation member 6 has higher thermal insulation properties than materials making the top layer 10a and the back layer 10b.

The thermal insulation member 6 preferably has recessed portions that provide a rough portion in an outer surface of the thermal insulation member 6. A contact area between the thermal insulation member 6 and elements arranged around the thermal insulation member 6 can be decreased by the recessed portions. That is, the recessed portions contribute to suppress a heat radiation from the thermal insulation member 6 to the elements arranged around the thermal insulation member 6. Moreover, the thermal insulation member 6 is preferably has a surface that is located adjacent to the heater body 10 and provided with a heat radiation suppressing layer that suppresses a radiation of the radiant heat to an outside. The heat radiation suppressing layer is designed to have emissivity, for radiating the radiant heat, which is smaller than emissivity of the heat generators 11 and the top layer 10a. The heat radiation suppressing layer may be made by an evaporated aluminum film or may be made by adhesive bonding of an aluminum sheet.

The heater case 4 has a back frame 40 and an interior side frame 41. The back frame 40 is located on the back side of the interior member 3 and protrudes inward. The interior side frame 41 is located on a side of the interior member 3 adjacent to the vehicle compartment and protrudes inward. The back frame 40 and the interior side frame 41 are provided in both end portions (i.e., an upper end portion and a lower end portion in FIG. 3) of the heater case 4 corresponding to one side and an other side facing the one side of the heater body 10. Therefore, each of the back frame 40 and the interior side frame 41 is not provided in all circumference of an outer peripheral portion of the heater case 4. The opening portion 42 is provided inside the back frame 40. A space defined between the back frame 40 and the interior side frame 41 is a housing space that houses the heater body 10 and the thermal insulation member 6. The back frame 40 and the interior side frame 41 support the heater body 10 and the thermal insulation member 6 arranged in the housing space from both sides thereof, and provide supporting force that prevents the heater body 10 and the thermal insulation member 6 from being removed easily. That is, the heater case 4 provides the supporting force to the heater body 10 in an upper portion (i.e., the upper end portion) and a lower portion (i.e., the lower end portion) of the heater case 4.

The heater body 10 has a perforation configuration 100 that is located outside the opening portion 42 that is the expansion permissive portion. The perforation configuration 100 is a configuration in which portions passing through the heater body 10 in a thickness direction of the heater body 10 and portions not passing through the heater body 10 in the thickness direction are arranged alternately with each other. That is, the perforation configuration 100 has penetrating portions arranged intermittently, and thereby having a lower strength and being broken easily by external force as compared to other portions of the heater body 10.

As shown in FIG. 1 and FIG. 3, the perforation configuration 100 is located not to overlap with the opening portion 42 in an expansion direction in which the air-bag device 5 expands. That is, the perforation configuration 100 and the opening portion 42 are arranged not to overlap with each other when viewing the heater body 10 from the vehicle compartment. As described above, the perforation configuration 100 is a low strength portion (i.e., a strength decreasing portion) of which strength is lower than strength of a portion of the heater body 10 corresponding to the opening portion 42. That is, a portion of the heater body 10 located on an inner side of the opening portion 42 adjacent to the vehicle compartment, i.e., a portion of the heater body 10 overlapping with the opening portion 42 in the expansion direction of the air-bag device 5, is higher than the strength of the perforation configuration 100.

Figure 4:
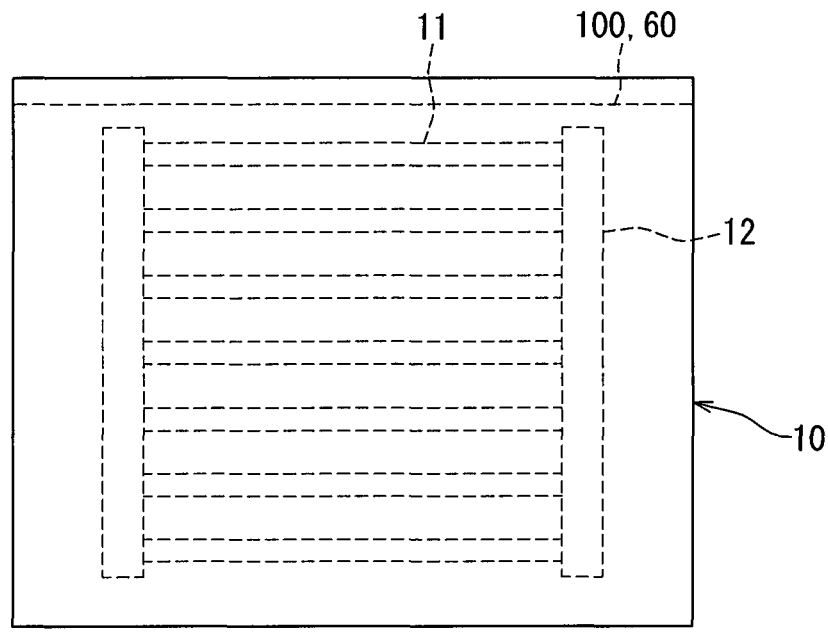
FIG. 4 is a diagram illustrating the radiant heater when viewed from a vehicle compartment, according to the first embodiment.

As shown in FIG. 4, the perforation configuration 100 is provided continuously from one end of an outer end portion to an other end of the outer end portion. The perforation configuration 100 is provided along an upper edge of the heater body 10 to connect end surfaces facing each other in the lateral direction. In other words, the perforation configuration 100 is provided along one outer edge (i.e., an upper edge in FIG. 4) of outer edges of the heater body 10 facing in a direction (i.e., an up-down direction in FIG. 4) perpendicular to a direction (i.e., a lateral direction in FIG. 4) in which the two terminals 12 are arranged. The perforation configuration 100 extends from one end to an other end of the heater body 10 facing in the direction in which the two terminal 12 are arranged. That is, the perforation configuration 100 is located above the heat generators 11 in the up-down direction and continuously extends across the heater body 10 from one end surface to an other end surface of the heater body 10 in the lateral direction. In other words, the perforation configuration 100 is located between the one outer edge of the heater body 10 and the heat generators 11 in the heater body 10, and extends along the one outer edge in an entire length of the one outer edge.

The heater case 4 supports, using the back frame 40 and the interior side frame 41, the one outer end portion (i.e., the upper end portion) of the heater body 10 provided with the perforation configuration 100 and an other outer end portion (i.e., a lower end portion) of the heater body 10 facing the one outer end portion. In addition, the heater case 4 supports a portion of the heater body 10 located closer to the one outer edge of the heater body 10 than the perforation configuration 100. Therefore, when the portions of the perforation configuration 100 not passing through the heater body 10 are broken, the heater case 4 can still support the upper end portion closer to the one outer edge of the heater body 10 than the perforation configuration 100, i.e., a portion of the heater body 10 located above the perforation configuration 100 in the up-down direction in FIG. 4, and the lower end portion of the heater body 10. In other words, when the heater body 10 is broken along the perforation configuration 100, the heater case 4 can still support the upper end portion of the heater body 10 located outside the perforation configuration 100 and the lower end portion of the heater body 10 facing the upper end portion.

The heater case 4 supports only the lower end portion of the heater body 10 in a portion of the heater body 10 located below the perforation configuration 100. As a result, when the heater body 10 is broken along the perforation configuration 100, an upper edge of the portion of the heater body 10 located below the perforation configuration 100 falls as bowing down. Accordingly, the heater body 10 can be configured not to prevent the air-bag device 5 from expanding. That is, since the heater body 10 is broken at the perforation configuration 100, the heater body 10 can be removed easily when the air-bag device 5 expands, and thereby an expansion of the air-bag device 5 is not interrupted.

Figure 5:
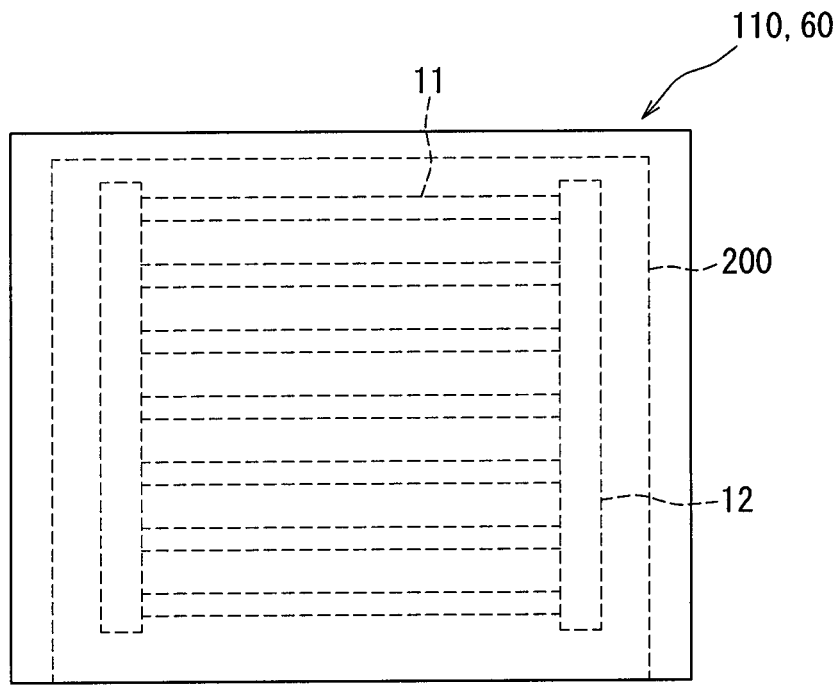
FIG. 5 is a diagram illustrating a radiant heater having a low strength portion when viewed from a vehicle compartment, according to a modification example of the first embodiment.

The low strength portion may be modified as a perforation configuration 200 shown in FIG. 5. That is, the perforation configuration 200 may extend continuously from one portion in an outer end portion of the heater body 110 to another portion in the outer end portion. Specifically, the perforation configuration 200 extends upward from a point in a lower edge of the heater body 110 that is located adjacent to a left end surface of the heater body 110, takes a 90-degree turn at a point adjacent to the upper edge and then extends from the point to a point adjacent to a right end surface, takes a 90-degree turn at the point adjacent to the right end surface and then extends to the lower edge. In other words, the perforation configuration 200 is provided along three of four outer edges of the heater body 110.

Specifically, the perforation configuration 200 has two perforation lines extending in the up-down direction along a first outer edge and a second outer edge of the heater body 110, respectively. The first outer edge and the second outer edge face each other in the direction (i.e., a lateral direction in FIG. 5) in which the two terminals 12 are arranged. More specifically, each of the two perforation lines extend from a third edge (i.e., the lower edge in FIG. 5) of the heater body 110, which is located at an end of the heater body 110 in the direction (i.e., an up-down direction in FIG. 5) perpendicular to the direction in which the two terminals 12 are arranged, to a point adjacent to a fourth edge (i.e., the upper edge in FIG. 5) of the heater body 110 facing the third edge in the up-down direction. Upper ends of the two perforation lines extending along the first outer edge and the second outer edge respectively are connected to each other by a perforation line extending in the lateral direction along the fourth outer edge.

According to the perforation configuration 200, the heater body 110 is broken along the perforation configuration 200 when the air-bag device 5 expands, and thereby a portion of the heater body 110 surrounded by the perforation configuration 200 falls, even in a case where the heater case 4 supports the heater body 110 along all outer edges of the heater body 110. Therefore, the heater body 110 can be configured not to prevent the air-bag device 5 from expanding.

The frames of the heater case 4 have attachment pieces protruding outward. The attachment pieces are provided with through holes respectively. The fixing screws are inserted to the through holes when the heater case 4 is attached to the interior member 3. The interior member 3 has bosses, and the bosses are provided with screw holes respectively. The bosses are located to coincide with the through holes of the attachment pieces of the heater case 4. The heater case 4 is fixed to the interior member 3 in a manner that the fixing screws are inserted to the screw holes of the bosses and the through holes of the attachment pieces respectively to fasten the heater case 4 and the interior member 3. The heater case 4 may be fixed to the interior member 3 by providing an engagement portion in which the heater case 4 and the interior member 3 are engaged with each other.

Operations and effects provided by the heating apparatus according to the first embodiment will be described hereafter. The heater 1 has the heater body 10 and the heater case 4. The heater body 10 has a sheet shape and emits heat supplied from the heat generators 11. The heater case 4 houses the heater body 10. The heater case 4 is located on the side of the air-bag device 5 for the vehicle adjacent to the vehicle compartment and is attached to the interior member 3 disposed in the vehicle compartment. The heater case 4 has the opening portion 42 as the expansion permissive portion that permits the air-bag device 5 to expand into the vehicle compartment. The heat generators 11 are arranged to include a portion corresponding to the opening portion 42. The heater body 10 has the perforation configuration 100 as the low strength portion that has a low strength as compared to the portion of the heat generators 11 corresponding to the opening portion 42 and that is located outside the opening portion 42.

According to the above-described configuration, the heat generators 11 are arranged in an area corresponding to the expansion permissive portion (i.e., the opening portion 42) that permits the air-bag device 5 to expand, and thereby the portion can supply the radiant heat to the vehicle compartment. As a result, the heater 1 can be configured to avoid reducing the amount of the radiant heat as compared to the above-described conventional technique and can be configured not to interrupt an expansion of the air-bag device 5. Furthermore, the heater body 10 of the heater 1 has the low strength portion (i.e., the perforation configuration 100) that has a low strength and is located outside the opening portion 42.

Accordingly, the perforation configuration 100 can be provided in a portion of the heater body 10 that is less necessary for radiating the radiant heat to the vehicle compartment, e.g., a portion of the heater body 10 located away from a center portion of the heater body 10 and located adjacent to the outer edge of the heater body 10. Since the heater body 10 is broken in the perforation configuration 100 when the air-bag device 5 expands, the heater body 10 does not interrupt an expansion of the air-bag device 5. Therefore, the heater 1 has a configuration that permits the air-bag device 5 to expand, and can secure a feeling of warmth of the passenger.

The low strength portion of the heater 1 has the perforation configuration 100 in which the portions passing through the heater body 10 in the thickness direction and the portions not passing through the heater body 10 are arranged alternately. The heater case 4 supports the portion of the heater body 10 located closer to the outer edge of the heater body 10 than the perforation configuration 100. Accordingly, the low strength portion can be provided in the heater body 10 with a simple configuration and with a small quantity of processes, e.g., by a method such as pressing. Therefore, the heater 1 can be broken easily when an expansion force is applied from the air-bag device 5 and can be manufactured with high productivity.

The perforation configuration 100 is provided to extend continuously from a portion of an outer edge of the heater body 10 to another portion of an outer edge of the heater body 10. Accordingly, the heater body 10 is torn along the perforation configuration 100 when the expansion force is applied to the heater body 10 by the expansion of the air-bag device 5, and thereby the heater body 10 can be divided certainly. The heater body 10, divided by the expansion force, permits the air-bag device 5 to break through the heater body 10 toward the vehicle compartment. Accordingly, the air-bag device 5 can expand to have a required volume in a specified time.

The heater 1 has the thermal insulation member 6 located on the back side of the heater body 10. The thermal insulation member 6 is arranged to fill a space defined between a back surface of the heater body 10 and the heater case 4. Accordingly, the thermal insulation member 6 can suppress a heat radiation toward the back side of the heater body 10. Therefore, the heater 1 can be provided with high heating performance for heating the vehicle compartment.

Moreover, the thermal insulation member 6 has a breakage promoting portion 60. The breakage promoting portion 60 has a similar configuration as the low strength portion (i.e., the perforation configuration 100) of the heater body 10 and is located to correspond to the low strength portion of the heater body 10. The breakage promoting portion 60 has a perforation configuration that is the similar configuration as the perforation configuration 100. Accordingly, the heater body 10 and the thermal insulation member 6 can be divided at the same time and at the same location when the air-bag device 5 expands. That is, the heater body 10 and the thermal insulation member 6 together can be falls from the heater case 4. As a result, the air-bag device 5 can expand smoothly to be in condition for exerting functions thereof in the specified time.

Second Embodiment

Figure 6:
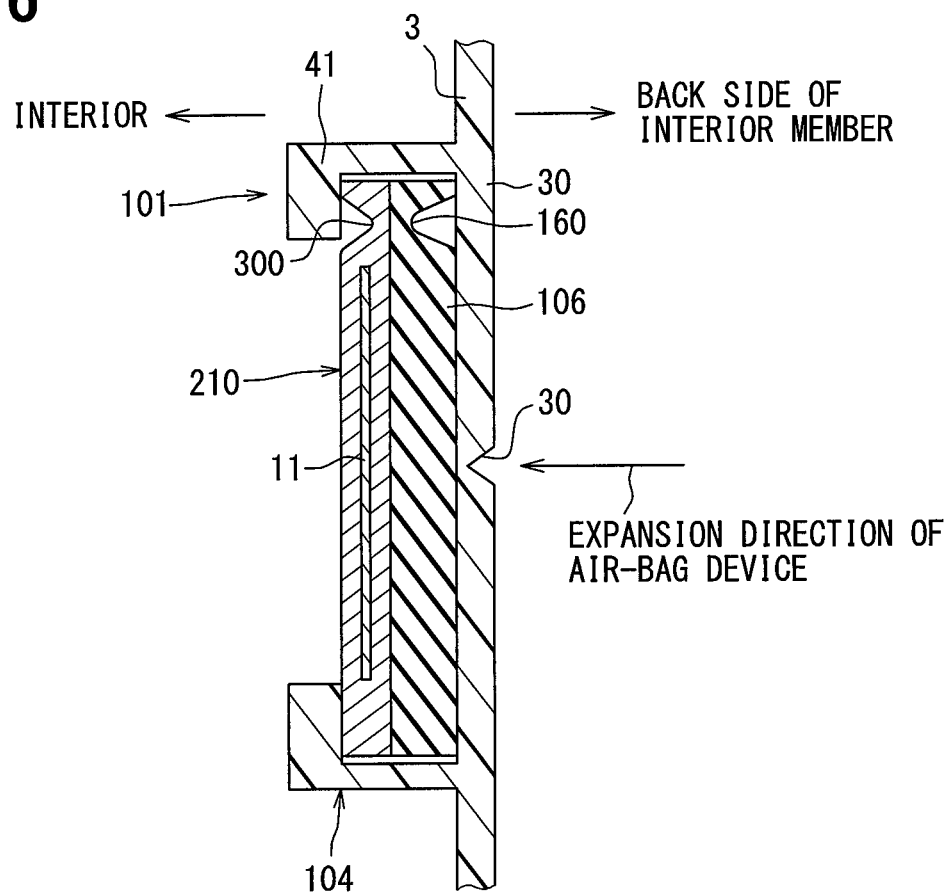
FIG. 6 is a cross-sectional view illustrating a locational relationship between a low strength portion of a radiant heater and an expansion permissive portion of a heater case, according to a second embodiment.

A radiant heater 101 according to a second embodiment will be described hereafter referring to FIG. 6. In the following description, features of the second embodiment that are different from the first embodiment will be described mainly.

The heater 101 of the second embodiment has a thin portion 300 as the low strength portion of a heater body 210. The thin portion 300 has a small thickness as compared to other portions in the heater body 210. The heater case 104 supports a portion of the heater body 210 located closer to an outer edge of the heater body 210 than the thin portion 300.

Accordingly, the heater body 210 is broken in the thin portion 300, of which thickness is small among the heater body 210, when the air-bag device 5 expands. In this case, the heater case 104 still can support an upper end portion (i.e., a portion located above the thin portion 300 in FIG. 6) of the heater body 210 located closer to the outer edge of the heater body 210 than the thin portion 300 and a lower end portion of the heater body 210. In other words, when the heater body 210 is broken along the thin portion 300, the heater case 4 still can support the upper end portion of the heater body 210 located outside the thin portion 300 and the lower end portion of the heater body 210 facing the upper end portion. Therefore, the heater case 104 supports only the lower end portion of the heater body 210 in an area located below the thin portion 300.

As a result, when the heater body 210 is broken in the thin portion 300, an upper edge of the portion of the heater body 210 located below the thin portion 300 falls as bowing down. Accordingly, the heater body 210 can be provided not to interrupt an expansion of the air-bag device 5. That is, the heater body 210 is removed from the heater case 4 easily when the air-bag device 5 expands, and thereby the expansion of the air-bag device 5 is not interrupted, since the heater body 210 is broken in the thin portion 300.

The heater case 104 is a part of the interior member 3. That is, the heater 101 has the heater case 104 as a portion configuring the interior member 3.

In addition, the heater case 104 houses the heater body 210 and a thermal insulation member 106. The thermal insulation member 106 has a similar configuration as the thin portion 300 of the heater body 210 and is located at a position corresponding to the thin portion 300. A breakage promoting portion 160 has a thin portion that has a small thickness than other portions of the breakage promoting portion 160. Accordingly, the heater body 210 and the thermal insulation member 106 can be divided into two or more pieces at the same time and at the same location when the air-bag device 5 expands. As a result, the heater body 210 and the thermal insulation member 106 can be removed from the heater case 104 at the same time. Therefore, the air-bag device 5 can expand smoothly to be in a condition for exerting functions thereof in a specified time.

Figure 7:
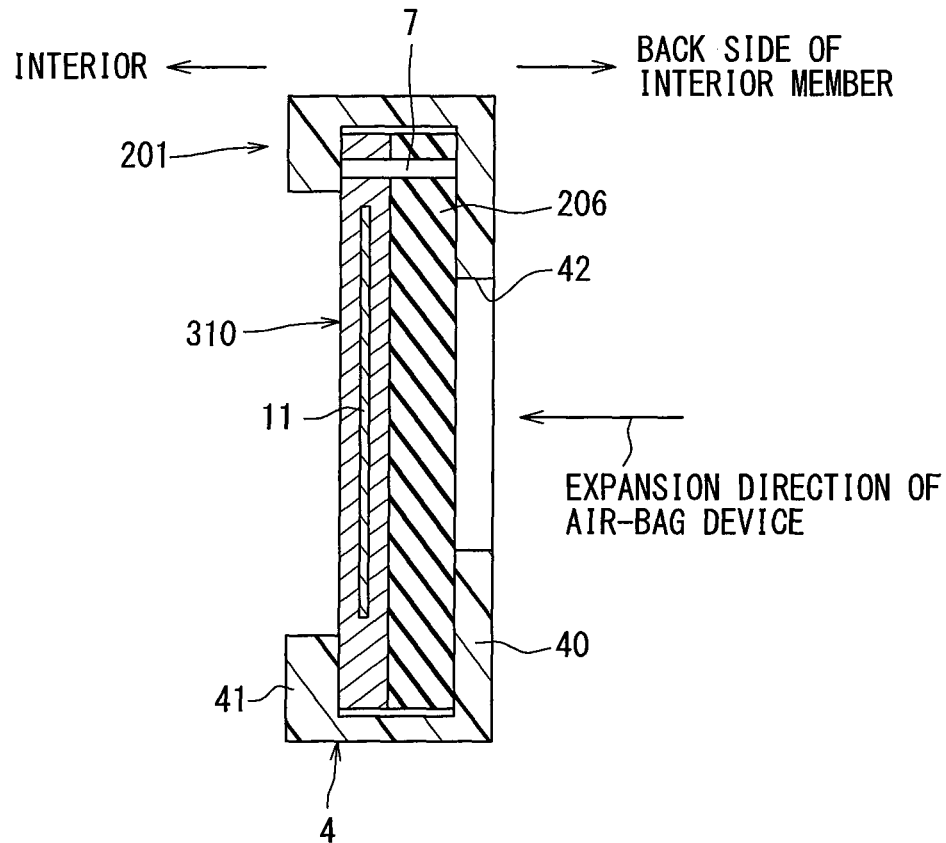
FIG. 7 is a cross-sectional view illustrating a locational relationship between a low strength portion of a radiant heater and an expansion permissive portion of a heater case, according to a third embodiment.

The heater 201 of the third embodiment is different in a configuration that supports a heater body 310 and a thermal insulation member 206 and configurations of a low strength portion and a breakage promoting portion 260, as compared to the heater 1. As shown in FIG. 7, the heater body 310 has a through hole. The heater case 4 supports the heater body 310 in a manner that a pin 7, which is a columnar member, is inserted to the through hole to pass through the heater body 310. The heater case 4 also supports the thermal insulation member 206 with the heater body 310 using the pin 7 passing through the thermal insulation member 206. Therefore, the heater body 310 and the thermal insulation member 206 falls from the heater case 4 when the pin 7 is removed from the heater body 310 and the thermal insulation member 206 or when an attachment portion of the pin 7 is divided from the heater body 310 and the thermal insulation member 206.

The heater body 310 has, as the low strength portion of the heater body 310, a perforation configuration 400 located outside the opening portion 42 that is the expansion permissive portion. The perforation configuration 400 is located at a position that is not overlap with the opening portion 42 in the expansion direction of the air-bag device 5. That is, the perforation configuration 400 and the opening portion 42 are not overlap with each other when viewing the heater body 310 from the vehicle compartment.

Figure 8:
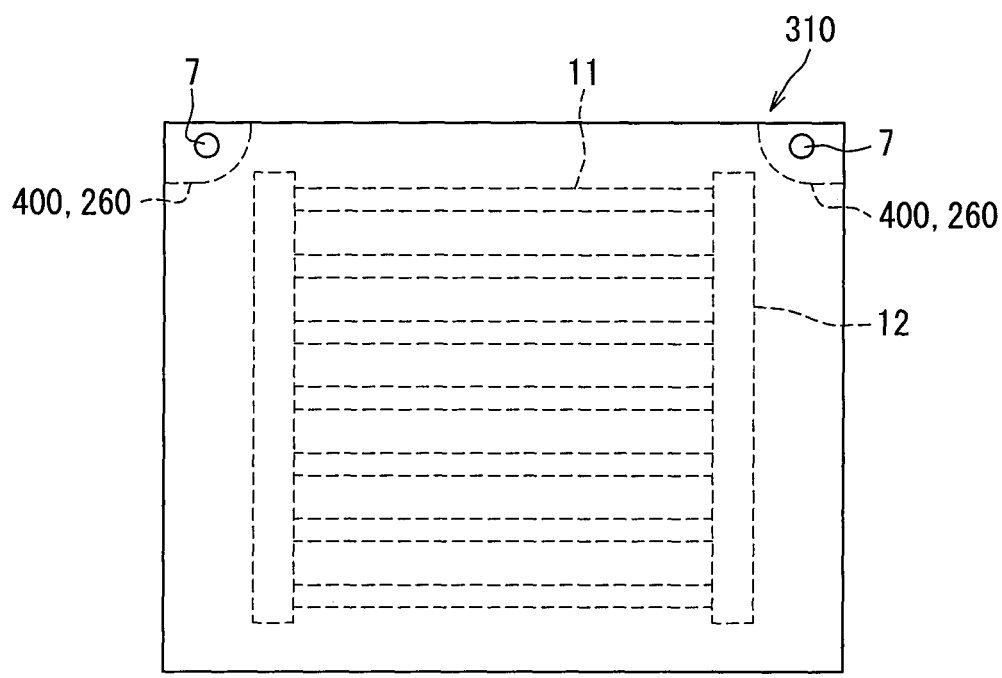
FIG. 8 is a diagram illustrating the radiant heater when viewed from a vehicle compartment, according to the third embodiment.

The perforation configuration 400 is the low strength portion in which portions passing through the heater body 310 in a thickness direction of the heater body 310 and portions not passing through the heater body 310 in the thickness direction are arranged alternately with each other, similar to the perforation configuration 100. The perforation configuration 400 is provided around the pin 7 to extend continuously from a portion in an outer edge of the heater body 310 to another portion in an outer edge of the heater body 310. The perforation configuration 400 has a low strength as compared to other portions of the heater body 310 since the perforation configuration 400 intermittently has the portions passing through the heater body 310 in the thickness direction. Accordingly, when expansion force is applied from the air-bag device 5, portions of the heater body 310 having the pin 7 as shown in FIG. 8, i.e., an upper-left corner portion and an upper-right corner portion of the heater body 310 shown in FIG. 8, and other portions of the heater body 310 are separated from each other.

In this case, the heater case 4 supports only an outer end portion (i.e., a lower end portion in FIG. 8) of the heater body 310 that faces an outer end portion of the heater body 310 having the pin 7 in a portion of the heater body 310 not being fixed by the pin 7, i.e., a portion located below the pin 7 in FIG. 8. Accordingly, an upper edge of the portion of the heater body 310, which is not being fixed by the pin 7, falls as bowing down. Therefore, the heater body 310 can be provided not to interrupt an expansion of the air-bag device 5.

In addition, the thermal insulation member 206 has the breakage promoting portion 260. The breakage promoting portion 260 has a similar configuration as the perforation configuration 400 of the heater body 310 and located at a position corresponding to the perforation configuration 400. Accordingly, the heater body 310 and the thermal insulation member 206 are divided into two or more pieces at the same time and at the same location when the air-bag device 5 expands. Thus, according to the present embodiment, the heater body 310 and the thermal insulation member 206 can be removed from the heater case 4 at the same time. Therefore, the air-bag device 5 can expand smoothly to be in a condition for exerting functions thereof in a specified time.

Figure 9:
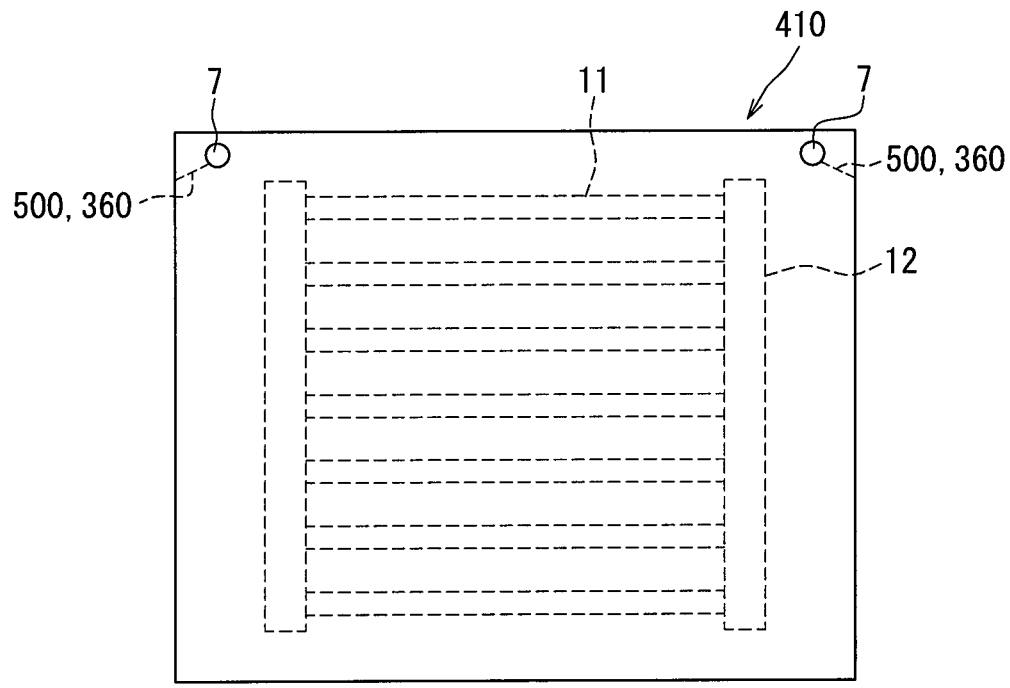
FIG. 9 is a diagram illustrating a radiant heater having a low strength portion when viewed from a vehicle compartment, according to a first modification example of the third embodiment.

The low strength portion of the third embodiment may be modified as shown in FIG. 9. FIG. 9 illustrates a perforation configuration 500 as a first modification example of the low strength portion. The perforation configuration 500 is provided to connect the through hole, in which the pin 7 is located to pass through the through hole, and an outer edge of the heater body 410 to each other. When the air-bag device 5 expands, all of the portions of the perforation configuration 500 not passing through the heater body 410, i.e., portions arranged one after another intermittently, are broken, and thereby the pin 7 falls from a broken line made by a breakage of the portions. Then, only the pin 7 is left on a condition of being attached to the heater case 4, and an entirety of the heater body 410 is completely separated from the heater case 4. In addition, the thermal insulation member 206 has a breakage promoting portion 360. The breakage promoting portion 360 has a similar configuration as the perforation configuration 500 of the heater body 410 and located at a position corresponding to the perforation configuration 500. In this case, the heater case 410 and the thermal insulation member 206 can be separated from the heater case 4 at the same time and at the same location when the air-bag device 5 expands.

Figure 10:
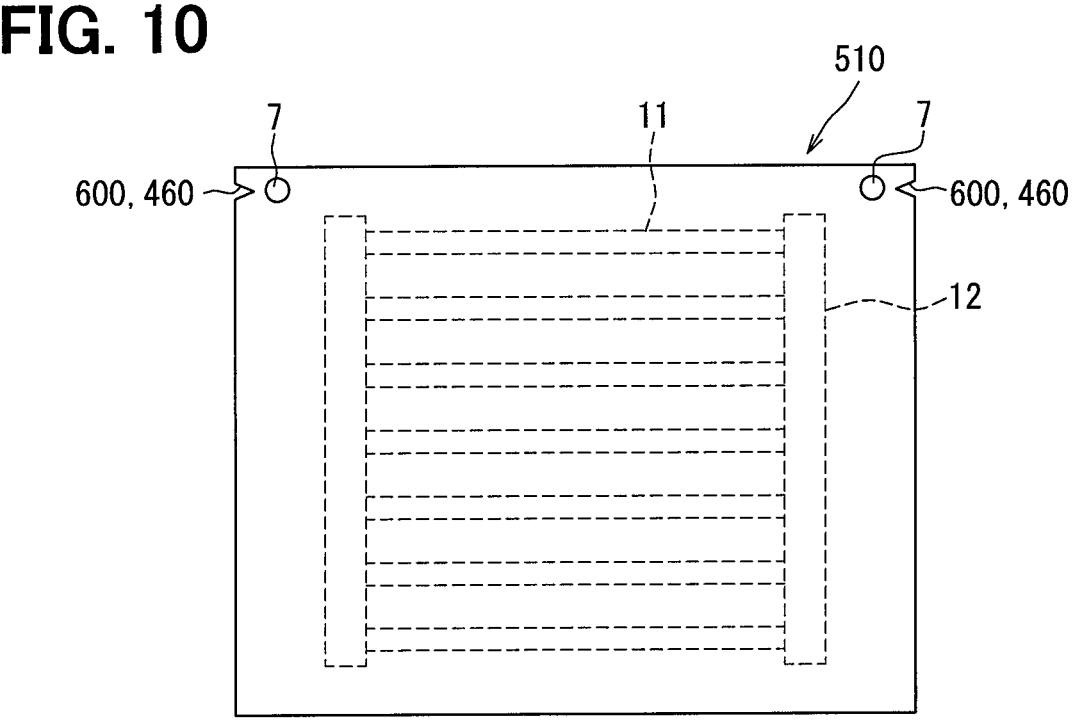
FIG. 10 is a diagram illustrating a radiant heater having a low strength portion when viewed from a vehicle compartment, according to a second modification example of the third embodiment.

The low strength portion of the third embodiment may be modified as shown in FIG. 10. FIG. 10 illustrates a notch configuration 600 as a second modification example of the low strength portion. The notch configuration 600 is configured as a cut line extending from an outer edge of the heater body 510 toward the pin 7. Accordingly, the heater body 510 is broken from the notch configuration 600, and thereby a cut line is made from the outer edge of the heater body 510 to the through hole in which the pin 7 is located to pass through the through hole, when the air-bag device 5 expands. The pin 7 falls from the cut line. Then, only the pin 7 is left on a condition of being attached to the heater case 4, and an entirety of a heater body 510 is completely separated from the heater case 4. In addition, the thermal insulation member 206 has a breakage promoting portion 460. The breakage promoting portion 460 has a similar configuration as the notch configuration 600 of the heater body 510 and is located at a position corresponding to the notch configuration 600. In this case, as described above, the heater body 510 and the thermal insulation member 206 can fall from the heater case 4 at the same time and at the same location when the air-bag device 5 expands.

Fourth Embodiment

A radiant heater 301 according to a fourth embodiment will be described hereafter referring to FIG. 11 to FIG. 14. In the following description, features of the fourth embodiment that are different from the above-described embodiments will be described mainly.

Figure 11:
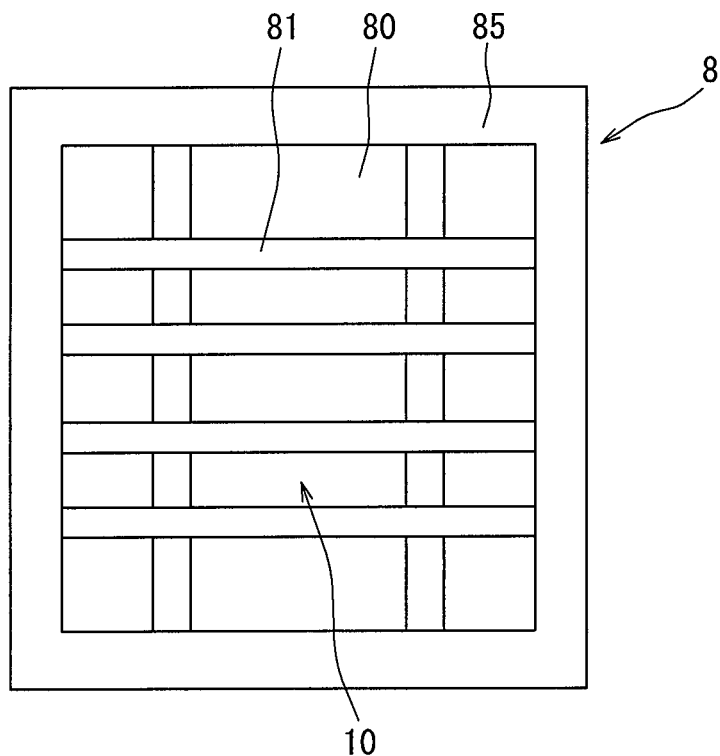
FIG. 11 is a diagram illustrating a protection portion of a radiant heater when viewed from a vehicle compartment, according to a fourth embodiment.

The heater 301 has a protection member 8 located on a side of the heater case 4 adjacent to the vehicle compartment. As shown in FIG. 11, the protection member 8 is a frame body that has a lattice portion 81 and a frame 85 erecting around the lattice portion 81. The protection member 8 protects the heater body 10 on the side adjacent to the vehicle compartment. The frame 85 has a square shape having four sides. The lattice portion 81 defines more than one opening portion 80. The more than one opening portion 80 may have different opening areas. In other words, the more than one opening portion 80 may include an opening portion 80 having different opening area than others.

Figure 12:
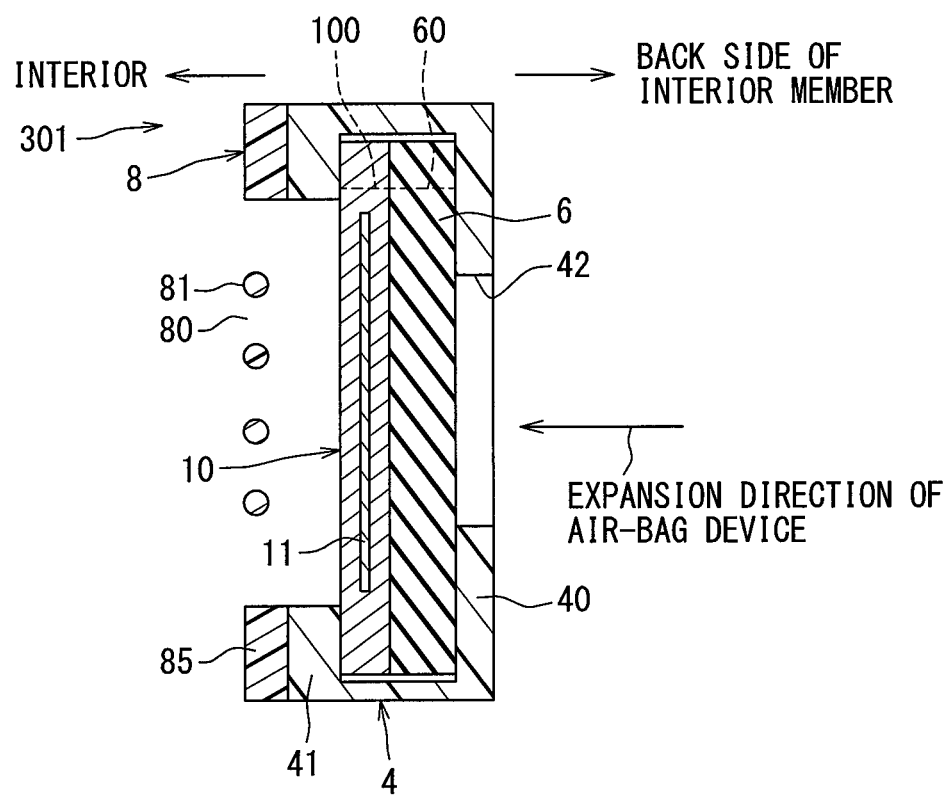
FIG. 12 is a cross-sectional view illustrating a locational relationship between a low strength portion of the radiant heater and an expansion permissive portion of a heater case, according to the fourth embodiment.

The protection member 8 has an opening configured by an aggregation of the more than one opening portion 80. As shown in FIG. 12, the opening of the protection member 8 is located in the heater 301 on the side adjacent to the vehicle compartment, and an opening area of the opening is smaller than an area of the top layer 10a. Here, an up-down direction (i.e., an up-down direction shown in FIG. 12) is defined as a direction in which one outer edge of the heater body 10 adjacent to the perforation configuration 100 and an other outer edge of the heater body 10 facing the one outer edge are arranged. Then, a dimension of the opening of the protection member 8 in the up-down direction is larger than or equal to a dimension of the heat generators 11 in the up-down direction. The protection member 8 can be attached to the heater case 4 by a structure such as fastening structure using a fixing screw or integrated structure fitting the protection member 8 and the heater case 4 to each other, similar to an attachment structure to couple the interior member 3 and the heater case 4 with each other.

Figure 13:
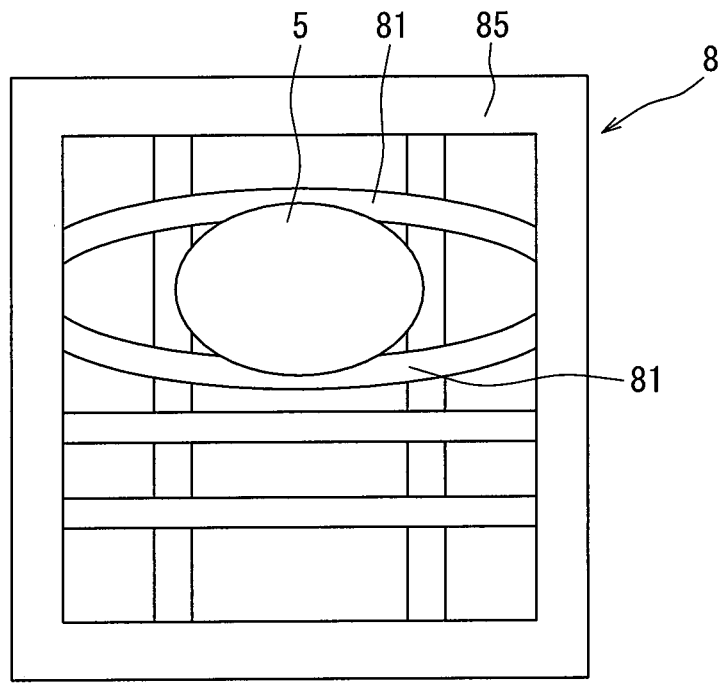
FIG. 13 is a diagram illustrating the protection portion, when viewed from the vehicle compartment, on a condition that the air-bag device expands, according to the fourth embodiment.
Figure 14:
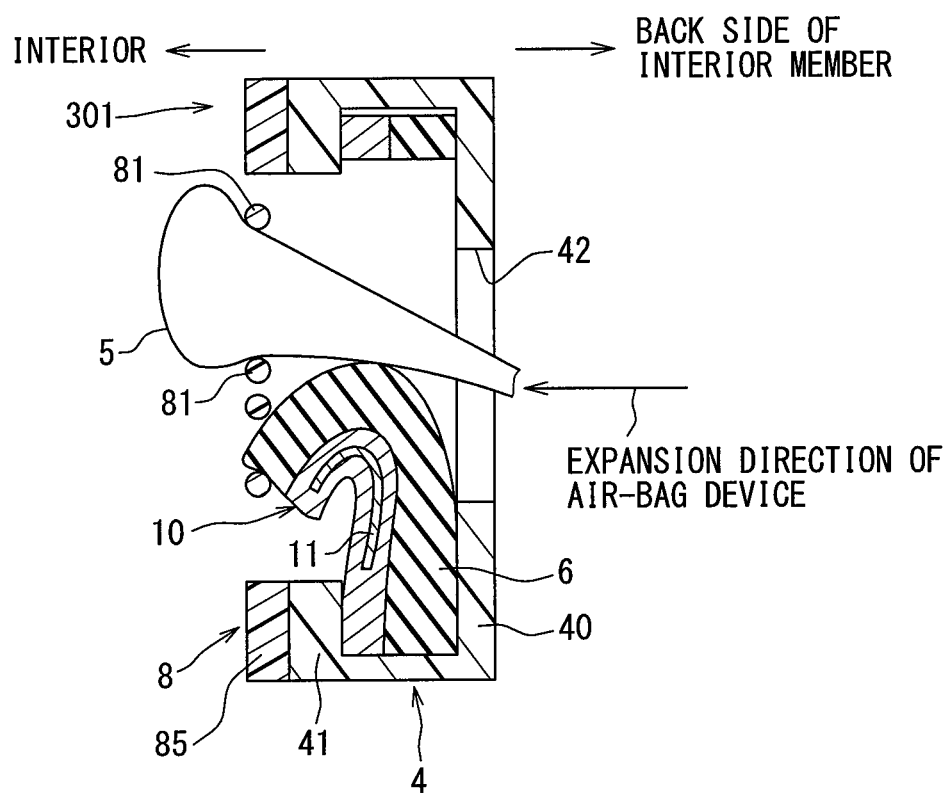
FIG. 14 is a cross-sectional view illustrating a heater body and the protection member on the condition that the air-bag device expands, according to the fourth embodiment.

The lattice portion 81 has a stiffness that enables the lattice portion 81 to deform easily by external force as compared to the frame 85. The lattice portion 81 is made of a material such as resin having a stiffness that enables the lattice portion 81 to deform by the expansion force from the air-bag device 5 or an elastomer including a synthetic rubber and a natural rubber. When the lattice portion 81 deforms, an opening area of the opening portion 80 located around a deformed portion of the lattice portion 81 becomes larger than opening areas of other opening portions 80. Therefore, as shown in FIG. 13 and FIG. 14, the protection member 8 permits the air-bag device 5 to expand into the vehicle compartment since the lattice portion 81 is deformed when the air-bag device 5 expands due to a collision of the vehicle. That is, the air-bag device 5 can break through the heater body 10 and the thermal insulation member 6, which are broken in the perforation configuration 100 and the breakage promoting portion 60 respectively, and expand into the vehicle compartment by deforming the lattice portion 81 of the protection member 8 widely.

According to the fourth embodiment, the lattice portion 81 deforms easily, thereby functioning as the expansion permissive portion. The expansion permissive portion is the low strength portion that has a lower strength than the frame 85. Accordingly, in a case that the heater 301 has the protection member 8, the lattice portion 81 deforms easily when the air-bag device 5 expands and pushes the lattice portion 81 from the back side. Thus, the air-bag device 5 can expand smoothly to be in condition for exerting functions thereof in a specified time.

Fifth Embodiment

Figure 15:
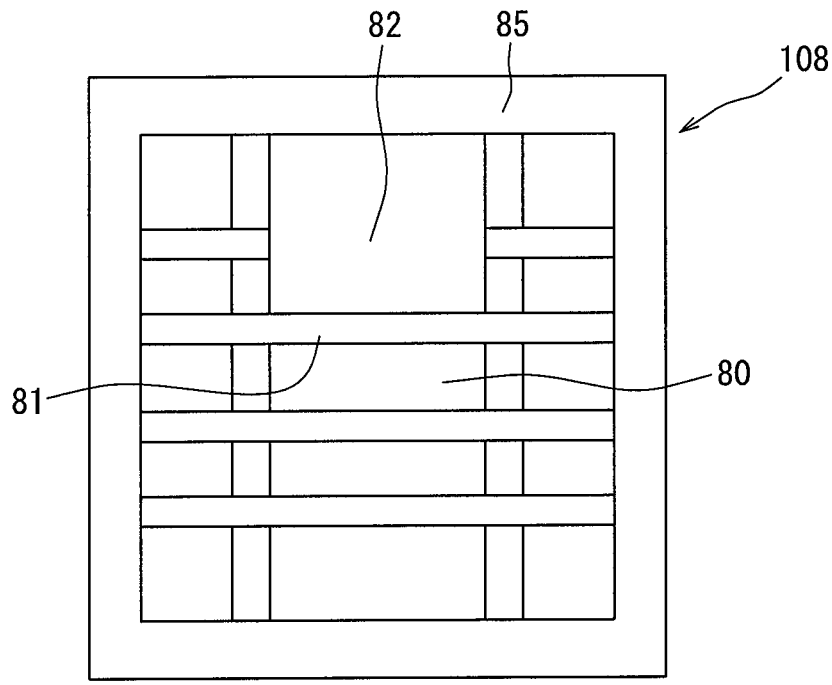
FIG. 15 is a diagram illustrating a protection member of a radiant heater when viewed from a vehicle compartment, according to a fifth embodiment.

A radiant heater 401 according to a fifth embodiment will be described hereafter referring to FIG. 15 and FIG. 16. In the following description, features of the fifth embodiment that are different from the above-described embodiments will be described mainly.

The heater 401 has a protection member 108 located on the side of the heater case 4 adjacent to the vehicle compartment. The protection member 108 is a frame body that has the lattice portion 81 and the frame 85 erecting around the lattice portion 81. The protection member 108 protects the heater body 10 on the side adjacent to the vehicle compartment. The frame 85 of the protection member 108 has a square shape having four sides. The lattice portion 81 defines opening portions 80 and a wide-spaced portion 82 of which opening area is larger than opening areas of the opening portions 80. As shown in FIG. 15, the wide-spaced portion 82 is a portion that has a larger dimension between two elongated portions configuring the lattice portion 81, i.e., an opening area defined between the two elongated portions, as compared to the opening portions 80. The protection member 108 can be attached to the heater case 4 by a structure such as a fastening structure using a fixing screw or an integrated structure fitting the protection member 108 and the heater case 4 to each other, similar to the above-described attachment structure coupling the heater case 4 and the interior member 3.

Figure 16:
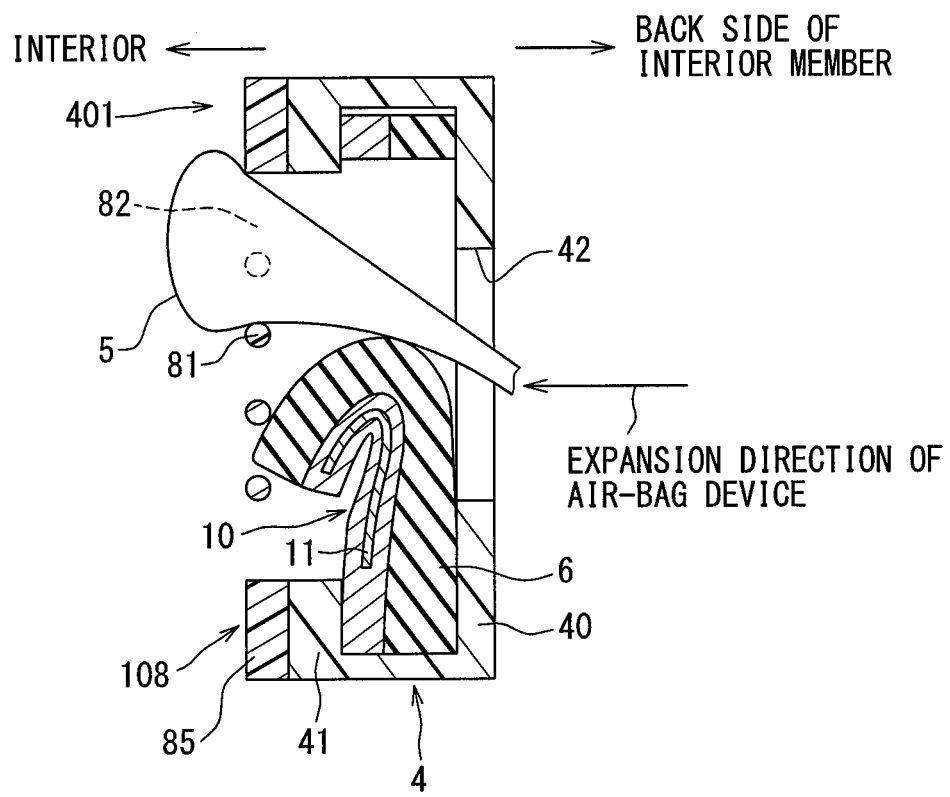
FIG. 16 is a cross-sectional view illustrating a heater body and the protection member on a condition that an air-bag device expands, according to the fifth embodiment.

Therefore, as shown in FIG. 16, when the air-bag device 5 expands due to a collision of the vehicle, the protection member 108 permits the air-bag device 5 to expand into the vehicle compartment from the wide-spaced portion 82. That is, the wide-spaced portion 82 is a path through which the air-bag device 5 passes when the air-bag device 5 expands. That is, the air-bag device 5 can break through the heater body 10 and the thermal insulation member 6, which are broken in the perforation configuration 100 and the breakage promoting portion 60 respectively, and expand into the vehicle compartment by deforming the lattice portion 81 of the protection member 8 widely.

According to the fourth embodiment, the wide-spaced portion 82 of the protection member 108 functioning as the expansion permissive portion. Accordingly, in a case that the heater 401 has the protection member 108, the air-bag device 5 can easily expand into the vehicle compartment from the wide-spaced portion 82 when the air-bag device 5 expands. Thus, the air-bag device 5 can expand smoothly to be in condition for exerting functions thereof in a specified time.

Sixth Embodiment

Figure 17:
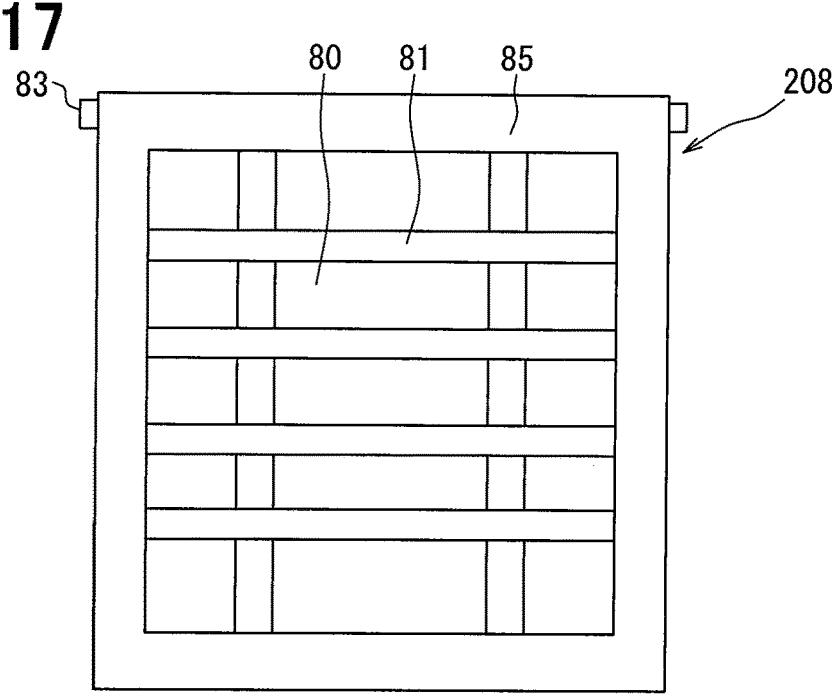
FIG. 17 is a diagram illustrating a protection member of a radiant heater when viewed from a vehicle compartment, according to a sixth embodiment.

A radiant heater 501 according to a sixth embodiment will be described hereafter referring to FIG. 17 and FIG. 18. In the following description, features of the sixth embodiment that are different from the above-described embodiments will be described mainly.

The heater 501 has a protection member 208 located on the side of the heater case 4 adjacent to the vehicle compartment. The protection member 208 is a frame body that has the lattice portion 81 and the frame 85 erecting around the lattice portion 81. The protection member 208 protects the heater body 10 on the side adjacent to the vehicle compartment. The frame 85 of the protection member 208 has a square shape having four sides. The lattice portion 81 defines the opening portions 80. As shown in FIG. 17 and FIG. 18, the protection member 208 has a shaft 83 that provides a rotary shaft in an end portion (i.e., an upper end portion in FIG. 18) of the frame 85 and enables the protection member 208 to be angularly displaceable as a whole.

Accordingly, the protection member 208 is angularly displaced around the shaft 83 when external force is applied to the protection member 208.

Figure 18:
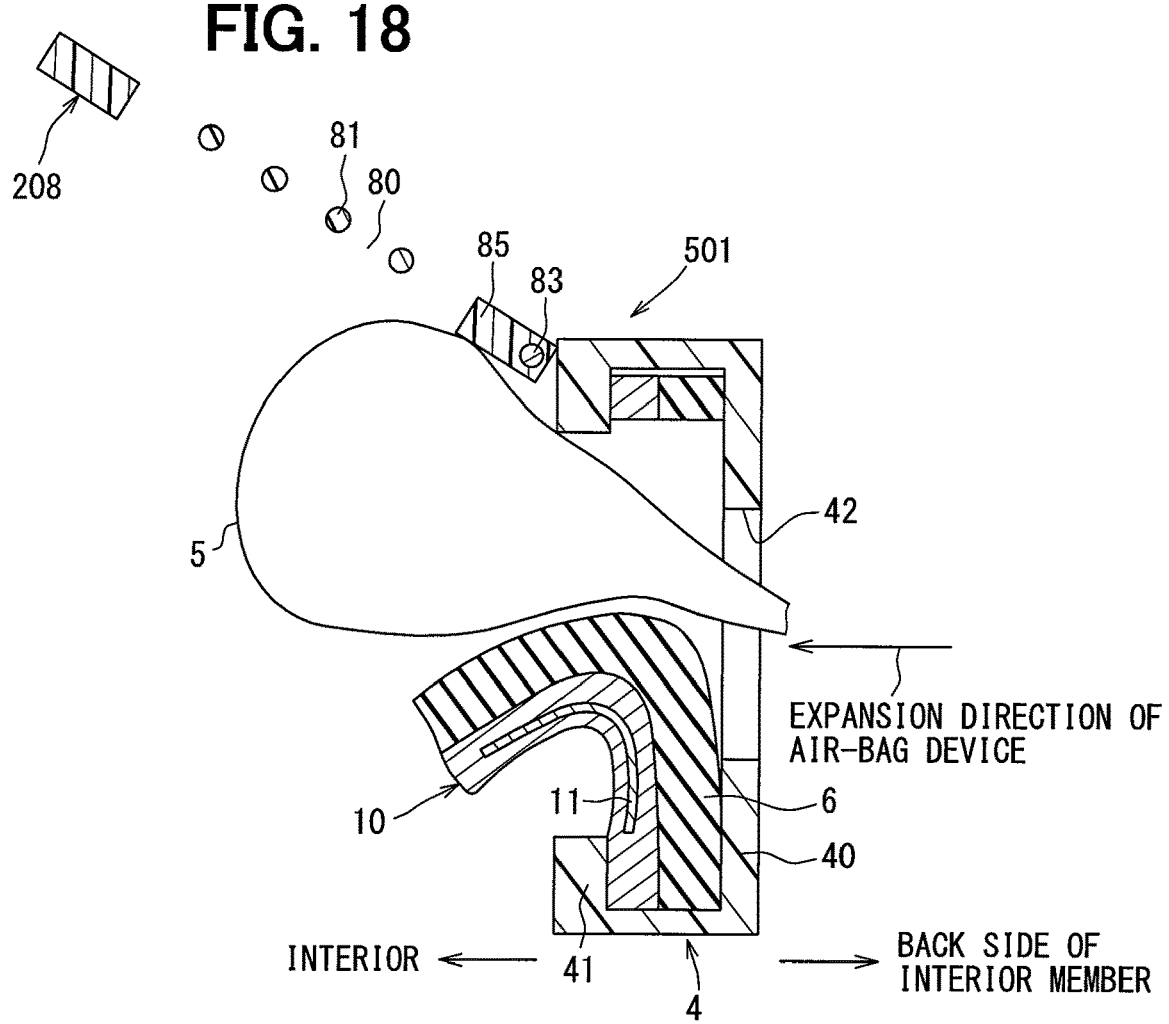
FIG. 18 is a cross-sectional view illustrating a heater body and the protection member on a condition that an air-bag device expands, according to the sixth embodiment.

As shown in FIG. 18, when the air-bag device 5 expands into the vehicle compartment, the air-bag device 5 pushes away the heater body 10, which is broken in the perforation configuration 100 and the breakage promoting portion 60, and the thermal insulation member 6, and pushes the protection member 208 from the back side. The protection member 208 is angularly displaced around the shaft 83 when being pushed from the back side, thereby permitting the air-bag device 5 to expand into the vehicle compartment.

The protection member 208 is attached to the heater case 4 by an integrated structure in which the protection member 208 and the heater case 4 fit to each other. Accordingly, the protection member 208 and the heater case 4 are released from being fitted together when the expansion force is applied from the air-bag device 5 to the protection member 208, and thereby the protection member 208 can be angularly displaced around the shaft 83.

According to the sixth embodiment, the above-described configuration that enables the protection member 208 to be angularly displaced around the shaft 83 functions as the expansion permissive portion. Therefore, in a case where the heater 501 has the protection member 208, nothing interrupts the air-bag device 5 to expand into the vehicle compartment, and the air-bag device 5 can expand into the vehicle compartment, since the protection member 208 moves toward the vehicle compartment when the air-bag device 5 expands. Thus, the air-bag device 5 can expand smoothly to be in condition for exerting functions thereof in a specified time.

Seventh Embodiment

Figure 19:
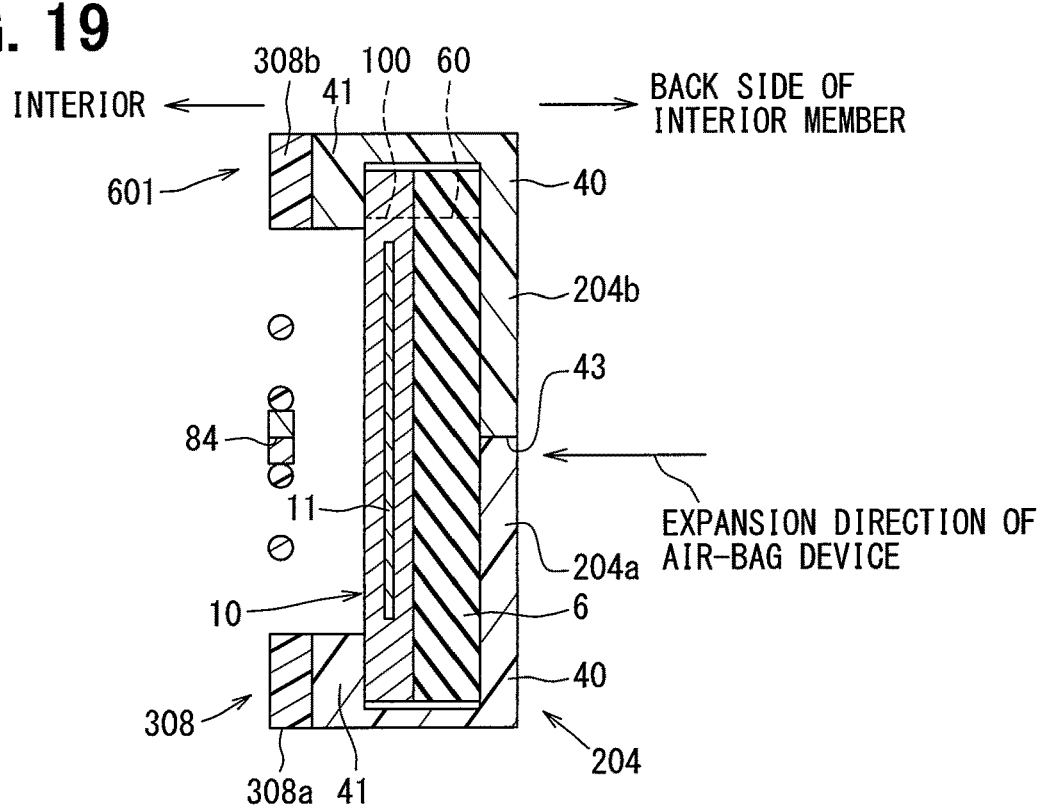
FIG. 19 is a cross-sectional view illustrating a heater body of a radiant heater, a heater case, and a protection member, according to a seventh embodiment.

A radiant heater 601 according to a seventh embodiment will be described hereafter referring to FIG. 19 and FIG. 20. In the following description, features of the seventh embodiment that are different from the above-described embodiments will be described mainly.

The heater 601 is different in a configuration that each of a heater case 204 and a protection member 308 is dividable by separation members. The heater case 204 has a first divided case 204a and a second divided case 204b being coupled with each other. According to the present embodiment, as shown in FIG. 19, the first divided case 204a and the second divided case 204b are located to face each other. Specifically, the first divided case 204a is located above the second divided case 204b and supports one outer end portion of the heater body 10 located adjacent to the perforation configuration 100.

A coupling portion 43 between the first divided case 204a and the second divided case 204b is located at a center of the heater case 204 in the up-down direction. The up-down direction is a direction in which the one outer edge of the heater body 10 adjacent to the perforation configuration 100 and the other outer edge facing the one outer edge are arranged. The first divided case 204a and the second divided case 204b are coupled to configure the heater case 204 with coupling force that permits the first divided case 204a and the second divided case 204b to be separated from each other when the expansion force is applied from the air-bag device 5. For example, the first divided case 204a and the second divided case 204b configure the heater case 204 by an integrated configuration in which the first divided case 204a and the second divided case 204b fit to each other.

The protection member 308 is configured by a first divided part 308a and a second divided part 308b coupled with each other. According to the present embodiment, the first divided part 308a is located above the second divided part 308b in the up-down direction. A coupling portion 84 between the first divided part 308a and the second divided part 308b is located at a center of the protection member 308 in the up-down direction. The coupling portion 84 is located at the same level as the coupling portion 43 of the heater case 204 in the up-down direction. A first divided part 208a and a second divided part 208b are coupled to configure the protection member 308 with coupling force that permits the first divided part 208a and the second divided part 208b to be separated from each other when the expansion force is applied from the air-bag device 5. For example, the first divided part 208a and the second divided part 208b configure the protection member 308 by an integrated configuration in which the first divided part 208a and the second divided part 208b fit to each other.

Figure 20:
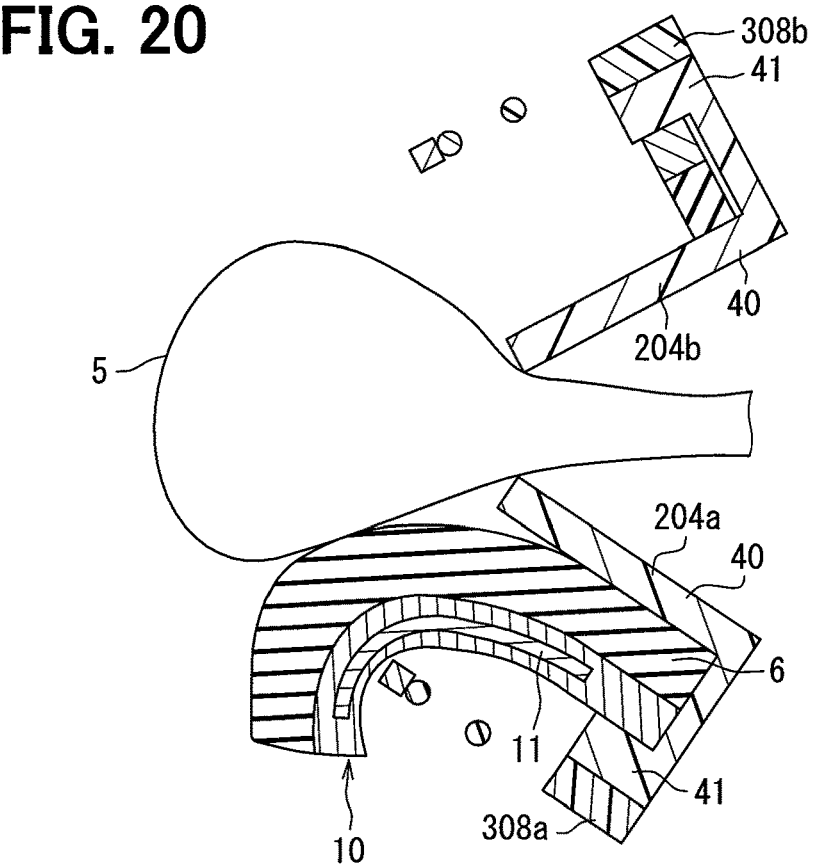
FIG. 20 is a cross-sectional view illustrating the heater body, the heater case, and the protection member on a condition that the air-bag device expands, according to the seventh embodiment.

As shown in FIG. 20, when the air-bag device 5 expands into the vehicle compartment, the heater case 204 is divided into the two cases in the up-down direction at the coupling portion 43, and the air-bag device 5 pushes away the heater body 10, which is broken in the perforation configuration 100 and the breakage promoting portion 60, and the thermal insulation member. Moreover, the protection member 208 is divided into two parts in the up-down direction at the coupling portion 84. The air-bag device 5 can expands into the vehicle compartment from a space defined between the divided two cases and a space defined between the divided two parts.

According to the seventh embodiment, the coupling portion 43 and the coupling portion 84 function as the expansion permissive portion. The expansion permissive portion is the low strength portion that has a lower strength than other portions. Therefore, nothing interrupts the air-bag device 5 to expand into the vehicle compartment, and the air-bag device 5 can expand smoothly into the vehicle compartment. Thus, the air-bag device 5 can expand smoothly to be in condition for exerting functions thereof in a specified time.

Eighth Embodiment

A radiant heater 701 according to an eighth embodiment will be described hereafter referring to FIG. 21. In the following description, features of the eighth embodiment that are different from the above-described embodiments will be described mainly.

The heater 701 of the eighth embodiment is different from the heater 601 of the seventh embodiment in a configuration that the heater 701 has a support member 9 located between the coupling portion 84 of the protection member 308 and the heater body 10. As shown in FIG. 21, the support member 9 reinforces the coupling portion 84, which is the low strength portion, when exterior force is applied to the coupling portion 84 from the side adjacent to the vehicle compartment. That is, the support member 9 prevents the protection member 308 from being divided when an impact is applied to the coupling portion 84 on a condition that the air-bag device 5 does not expand. Therefore, according to the eighth embodiment, the support member 9 can prevent the protection member 308 from being broken up even when an object such as a passenger makes an impact on the protection member 308. In addition, the support member 9 can prevent the heater body 10 from being damaged due to the breakup of the protection member 308.

Ninth Embodiment

A radiant heater 801 according to a ninth embodiment will be described hereafter referring to FIG. 22. In the following description, features of the ninth embodiment that are different from the above-described embodiments will be described mainly.

The heater 801 has the heater body 10, the thermal insulation member 6, and a heater case 304. The thermal insulation member 6 is provided integrally with the heater body 10. The heater case 304 houses the heater body 10 and the thermal insulation member 6. The heater case 304 is located on the side of the air-bag device 5 adjacent to the vehicle compartment, and is attached to the interior member 3 disposed in the vehicle compartment. For example, the thermal insulation member 6 is provided integrally with the heater body 10 by using an adhesive material.

The heater case 304 has the opening portion 42 as the expansion permissive portion and a protruding portion 44. The opening portion 42 permits the air-bag device 5 to expand into the vehicle compartment. The protruding portion 44 supports the thermal insulation member 6 by digging into the thermal insulation member 6 or by snagging the thermal insulation member 6. In other words, the protruding portion 44 supports the thermal insulation member 6 to be removable. A structure in which the protruding portion 44 supports the thermal insulation member 6 provides a small retaining force as compared to retaining force provided by a method such as adhesion, tucking, or fastening using a screw. Accordingly, the structure in which the protruding portion 44 supports the thermal insulation member 6 configures the above-described low strength portion.

The protruding portion 44 is not limited to be provided at one position. More than one protruding portion 44 may provide restraining force to the thermal insulation member 6. The heat generators 11 are arranged at a position corresponding to the opening portion 42. The protruding portion 44 is located outside the opening portion 42.

According to the ninth embodiment, the heater 801 has the heat generators 11 in a portion corresponding to the expansion permissive portion that permits an expansion of the air-bag device 5, and thereby the portion can radiate the radiant heat into the vehicle compartment. As a result, the heater 801 for heating can be configured to avoid reducing the amount of the radiant heat as compared to the above-described conventional technique and can be configured not to interrupt an expansion of the air-bag device 5. Moreover, according to the heater 801, a structure configured by the protruding portion 44 and the thermal insulation member 6 provides the low strength portion that has low strength and that is located outside the expansion permissive portion. Accordingly, the low strength portion can be provided in a portion that is less necessary for radiating the radiant heat to the vehicle compartment. In addition, the thermal insulation member 6 is released from being supported by the protruding portion 44 when the air-bag device 5 expands, and thereby the radiant heater 801 can be provided not to interrupt an expansion of the air-bag device 5. Thus, the heater 801 can have a configuration that permits the air-bag device 5 to expand, and can secure a feeling of warmth of the passenger.

Other Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The present disclosure is intended to cover various modifications and equivalent arrangements within the scope of the present disclosure.

According to the sixth embodiment, the protection member 208 is angularly displaced around the shaft 83 when the expansion force is applied from the air-bag device 5. However, a configuration to move the protection member 208 is not limited to such an example. For example, a configuration in which a protection member is displaced slidably when the expansion force is applied from the air-bag device 5 may be employed.

According to the ninth embodiment, the heater case 304 may be provided as a part of the interior member 3. That is, the heater 801 of the ninth embodiment may have the heater case 304 that is provided as a part of the interior member 3.

What is claimed is:

1. A heating apparatus comprising:
    a heater body having a sheet shape, the heater body has a heat generator and emits heat supplied from the heat generator, the heat generator generates the heat when being energized; and
    a heater case that houses the heater body, the heater case is arranged on a side of an air-bag device for a vehicle adjacent to a vehicle compartment, the heater case is attached to an interior member located in the vehicle compartment or is a part of the interior member, wherein
    the heater case has an expansion permissive portion that permits the air-bag device to expand into the vehicle compartment,
    the heat generator includes a portion located at a position corresponding to the expansion permissive portion,
    the heater body has a low strength portion that has a low strength as compared to the portion of the heat generator and that is located outside the expansion permissive portion,
    the low strength portion has a thin portion that has a smaller thickness dimension as compared to other portions of the heater body, and
    the heater case supports a portion of the heater body that is located closer to an outer edge of the heater body than the thin portion.

2. The heating apparatus according to claim 1, wherein
    the low strength portion has a perforation configuration in which portions passing through the heater body in a thickness direction of the heater body and portions not passing through the heater body in the thickness direction are arranged alternately with each other, and
    the heater case supports a portion of the heater body that is located closer to the outer edge of the heater body than the perforation configuration.

3. The heating apparatus according to claim 2, wherein
    the perforation configuration is provided continuously from a portion of the outer edge of the heater body to another portion of the outer edge.

4. The heating apparatus according to claim 1, wherein
    the heater case supports the heater body by using a columnar member that passes through the heater body, and the low strength portion is provided around the columnar member and has a perforation configuration or a notch configuration, the perforation configuration in which portions passing through the heater body in a thickness direction of the heater body and portions not passing through the heater body in the thickness direction are arranged alternately with each other.

5. The heating apparatus according to claim 1, wherein
    the thin portion is provided continuously from a portion of the outer edge of the heater body to another portion of the outer edge.

6. The heating apparatus according to claim 1, further comprising
    a thermal insulation member that is located on a side of the heater body opposite to the vehicle compartment, the thermal insulation member covering the heater body, wherein
    the thermal insulation member has a breakage promoting portion that has a similar configuration as the low strength portion of the heater body and that is located at a position corresponding to the low strength portion of the heater body.

7. The heating apparatus according to claim 1, wherein
    the expansion permissive portion is an opening portion passing through the heater body.

8. The heating apparatus according to claim 1, wherein
    the expansion permissive portion is an opening portion passing through the heater case.

9. The heating apparatus according to claim 1, further comprising
    a protection member that is located on a side of the heater body adjacent to the vehicle compartment and protects the heater body, wherein
    the protection member is deformed and permits the air-bag device to expand into the vehicle compartment.

10. The heating apparatus according to claim 1, further comprising
    a protection member that is located on a side of the heater body adjacent to the vehicle compartment, wherein
    the protection member has a wide-spaced portion that has a larger dimension between elongated portions protecting the heater body as compared to other portions of the protection member.

11. The heating apparatus according to claim 1, further comprising
    a protection member that is located on a side of the heater body adjacent to the vehicle compartment, wherein
    the protection member is a frame body protecting the heater body and has a lattice portion and a frame erecting around the lattice portion, and
    the lattice portion defines
        a plurality of opening portions and
        a wide-spaced portion of which opening area is larger than opening areas of the plurality of opening portions.

12. The heating apparatus according to claim 1, further comprising
    a protection member that is located on a side of the heater body adjacent to the vehicle compartment and protects the heater body, wherein
    the protection member is configured to be angularly displaceable around a shaft when the air-bag device expands into the vehicle compartment.

13. The heating apparatus according to claim 1, further comprising
a protection member that is located on a side of the heater body adjacent to the vehicle compartment and protects the heater body, wherein
the protection member has
a lattice portion,
a frame erecting around the lattice portion, and
a shaft that provides a rotary shaft in an end portion of the frame and enables the protection member as a whole to be angularly displaceable,
the protection member is a frame body that protects the heater body, and
the protection member is angularly displaceable around the shaft when the air-bag device expands into the vehicle compartment.

14. A heating apparatus comprising:
a heater body that has a heat generator and emits heat supplied from the heat generator, the heat generator generates the heat when being energized;
a thermal insulation member that is located on a side of the heater body opposite to a vehicle compartment, the thermal insulation member being provided integrally with the heater body; and
a heater case that houses the heater body and the thermal insulation member, the heater case being located on a side of an air-bag device for a vehicle adjacent to the vehicle compartment, the heater case is attached to an interior member disposed in the vehicle compartment or is a part of the interior member, wherein
the heater case has
an expansion permissive portion that permits the air-bag device to expand into the vehicle compartment and
a protruding portion that supports the thermal insulation member by digging into the thermal insulation member or by snagging the thermal insulation member,
the heat generator is located at a position corresponding to the expansion permissive portion, and
the protruding portion is located at a position outside the expansion permissive portion.

15. A heating apparatus comprising:
a heater body having a sheet shape, the heater body has a heat generator and emits heat supplied from the heat generator, the heat generator generates the heat when being energized;
a thermal insulation member that is located on a side of the heater body opposite to a vehicle compartment, the thermal insulation member being provided integrally with the heater body; and
a heater case that houses the heater body and the thermal insulation member, the heater case being located on a side of an air-bag device adjacent to the vehicle compartment, the heater case is attached to an interior member disposed in the vehicle compartment or is a part of the interior member, wherein
the heater case has
an expansion permissive portion that permits the air-bag device to expand into the vehicle compartment and
a protruding portion that supports the thermal insulation member to be removable,
the heat generator is located at a position corresponding to the expansion permissive portion, and
the protruding portion is located at a position outside the expansion permissive portion.

* * * * *